(12) United States Patent
Nagata

(10) Patent No.: US 12,019,743 B2
(45) Date of Patent: Jun. 25, 2024

(54) CONTROLLER SYSTEM

(71) Applicant: OMRON CORPORATION, Kyoto (JP)

(72) Inventor: Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 280 days.

(21) Appl. No.: 17/434,658

(22) PCT Filed: Feb. 26, 2020

(86) PCT No.: PCT/JP2020/007802
§ 371 (c)(1),
(2) Date: Aug. 27, 2021

(87) PCT Pub. No.: WO2020/189207
PCT Pub. Date: Sep. 24, 2020

(65) Prior Publication Data
US 2022/0171850 A1 Jun. 2, 2022

(30) Foreign Application Priority Data
Mar. 15, 2019 (JP) ................................. 2019-047995

(51) Int. Cl.
*G06F 21/55* (2013.01)
*G06F 21/57* (2013.01)
*G06F 21/64* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS 8,949,668 B2 * 2/2015 Hanks ................ G05B 23/0216
714/48
9,998,487 B2 * 6/2018 Mestha ................ G06F 21/552
(Continued)

FOREIGN PATENT DOCUMENTS

CA 2 619 742 A1 12/2006
CN 101118434 A 2/2008
(Continued)

OTHER PUBLICATIONS

International Search Report for PCT/JP2020/007802 dated Apr. 21, 2020 [PCT/ISA/210].
(Continued)

*Primary Examiner* — Venkat Perungavoor
(74) *Attorney, Agent, or Firm* — Sughrue Mion, PLLC

(57) ABSTRACT

A controller system includes a controller that executes a control operation in order to control a control target, and a security unit that is in charge of a security function for the controller system. The security unit includes a detector that detects a presence or absence of an incident regarding security in the controller system. The controller transitions a control mode to a degeneration mode when the detector detects the incident, and the controller maintains the control mode in the degeneration mode until cancellation of the incident is detected by the detector.

14 Claims, 18 Drawing Sheets

(56) References Cited

U.S. PATENT DOCUMENTS

| | | | |
|---|---|---|---|
| 2005/0068051 A1 | 3/2005 | Tesdahl et al. | |
| 2008/0033898 A1 | 2/2008 | Hashimoto | |
| 2013/0242756 A1 | 9/2013 | Miyazaki et al. | |
| 2015/0048952 A1 | 2/2015 | Murphy | |
| 2015/0295944 A1* | 10/2015 | Yunoki | G06F 21/56 |
| | | | 726/24 |
| 2017/0075336 A1 | 3/2017 | Ueda | |
| 2017/0169219 A1 | 6/2017 | Ogawa et al. | |
| 2018/0096153 A1* | 4/2018 | DeWitte | G06F 16/9535 |
| 2018/0224842 A1 | 8/2018 | Ichimura | |
| 2018/0359272 A1* | 12/2018 | Mizrachi | H04L 67/535 |
| 2020/0128042 A1* | 4/2020 | Ochoa | H04L 9/3247 |
| 2021/0048796 A1* | 2/2021 | Rieger | G06F 21/82 |
| 2021/0049275 A1* | 2/2021 | Higashiyama | H04L 63/20 |
| 2021/0112090 A1* | 4/2021 | Rivera | H04L 63/1441 |
| 2021/0382989 A1* | 12/2021 | Wei | G06F 21/552 |
| 2022/0277075 A1* | 9/2022 | Cummings | H04W 48/16 |

FOREIGN PATENT DOCUMENTS

| | | |
|---|---|---|
| CN | 104126108 A | 10/2014 |
| CN | 106101163 A | 11/2016 |
| CN | 106886202 A | 6/2017 |
| JP | 60-159904 A | 8/1985 |
| JP | 64-032302 A | 2/1989 |
| JP | 06-214443 A | 8/1994 |
| JP | 2000-137506 A | 5/2000 |
| JP | 2001-298426 A | 10/2001 |
| JP | 2002-192805 A | 7/2002 |
| JP | 2006-207904 A | 8/2006 |
| JP | 2007-304914 A | 11/2007 |
| JP | 2010-231737 A | 10/2010 |
| JP | 2013-115603 A | 6/2013 |
| JP | 2015-176369 A | 10/2015 |
| JP | 2018-128820 A | 8/2018 |
| JP | 2018-185712 A | 11/2018 |
| JP | 2018-200731 A | 12/2018 |
| RU | 30 009 U1 | 6/2003 |
| WO | 2015/001594 A1 | 1/2015 |
| WO | 2017/201520 A1 | 11/2017 |
| WO | 2018/052435 A1 | 3/2018 |
| WO | 2018/120209 A1 | 7/2018 |

OTHER PUBLICATIONS

Written Opinion for PCT/JP2020/007802 dated Apr. 21, 2020 [PCT/ISA/237].

Office Action dated Oct. 11, 2022 issued by the Japanese Patent Office in Japanese Application No. 2019-047995.

Extended European Search Report dated Nov. 24, 2022 in European Application No. 20773570.5.

Office Action issued Jan. 5, 2024 in Chinese Application No. 202080017554.6.

* cited by examiner

FIG.9

| INCIDENT CHARACTERISTIC | FACILITY A | FACILITY B | FACILITY C |
|---|---|---|---|
| NONE (NORMAL OPERATION) | FACILITY CONTROL: NORMAL OPERATION INFORMATION COMMUNICATION: NORMAL OPERATION | FACILITY CONTROL: NORMAL OPERATION INFORMATION COMMUNICATION: NORMAL OPERATION | FACILITY CONTROL: NORMAL OPERATION INFORMATION COMMUNICATION: NORMAL OPERATION |
| RANDOM FALSIFICATION | FACILITY CONTROL: NORMAL OPERATION INFORMATION COMMUNICATION: DEGENERATION A1 | FACILITY CONTROL: NORMAL OPERATION INFORMATION COMMUNICATION: NORMAL OPERATION | FACILITY CONTROL: DEGENERATION C1 INFORMATION COMMUNICATION: DEGENERATION C2 |
| RESOURCE EXHAUSTION | FACILITY CONTROL: DEGENERATION A2 INFORMATION COMMUNICATION: DEGENERATION A3 | FACILITY CONTROL: DEGENERATION B1 INFORMATION COMMUNICATION: DEGENERATION B2 | FACILITY CONTROL: STOP INFORMATION COMMUNICATION: DEGENERATION C3 |
| DDoS ATTACK | FACILITY CONTROL: STOP INFORMATION COMMUNICATION: DEGENERATION A4 | FACILITY CONTROL: NORMAL OPERATION INFORMATION COMMUNICATION: DEGENERATION B3 | FACILITY CONTROL: STOP INFORMATION COMMUNICATION: DEGENERATION C4 |
| ... | | | |

FIG.10

| INCIDENT CHARACTERISTIC | FACILITY A | FACILITY B | FACILITY C |
|---|---|---|---|
| NONE (NORMAL OPERATION) | FACILITY CONTROL: NORMAL OPERATION INFORMATION COMMUNICATION: NORMAL OPERATION | FACILITY CONTROL: NORMAL OPERATION INFORMATION COMMUNICATION: NORMAL OPERATION | FACILITY CONTROL: NORMAL OPERATION INFORMATION COMMUNICATION: NORMAL OPERATION |
| LEVEL 1 | FACILITY CONTROL: NORMAL OPERATION INFORMATION COMMUNICATION: DEGENERATION A1 | FACILITY CONTROL: NORMAL OPERATION INFORMATION COMMUNICATION: DEGENERATION B1 | FACILITY CONTROL: NORMAL OPERATION INFORMATION COMMUNICATION: DEGENERATION C1 |
| LEVEL 2 | FACILITY CONTROL: DEGENERATION A2 INFORMATION COMMUNICATION: DEGENERATION A3 | FACILITY CONTROL: DEGENERATION B1 INFORMATION COMMUNICATION: DEGENERATION B2 | FACILITY CONTROL: NORMAL OPERATION INFORMATION COMMUNICATION: DEGENERATION C2 |
| LEVEL 3 | FACILITY CONTROL: STOP INFORMATION COMMUNICATION: DEGENERATION A4 | FACILITY CONTROL: STOP INFORMATION COMMUNICATION: DEGENERATION B3 | FACILITY CONTROL: DEGENERATION C3 INFORMATION COMMUNICATION: DEGENERATION C4 |

FIG. 11

| INCIDENT | | | | |
|---|---|---|---|---|
| | FACILITY A | FACILITY B | FACILITY C | |

| INCIDENT | FACILITY A (OPERATION) | FACILITY B | FACILITY C |
|---|---|---|---|
| INCIDENT CHARACTERISTIC | | | |
| NONE (NORMAL OPERATION) | FACILITY CONTROL: NORMAL OPERATION INFORMATION COMMUNICATION: NORMAL OPERATION | | |
| RANDOM FALSIFICATION | FACILITY CONTROL: NORMAL OPERATION INFORMATION COMMUNICATION: DEGENERATION A1 | | |
| RESOURCE EXHAUSTION | FACILITY CONTROL: DEGENERATION A2 INFORMATION COMMUNICATION: DEGENERATION A3 | | |
| DDoS ATTACK | FACILITY CONTROL: DEGENERATION A4 INFORMATION COMMUNICATION: DEGENERATION A5 | | |
| ... | | | |

| INCIDENT | FACILITY A (MAINTENANCE) | FACILITY B | FACILITY C |
|---|---|---|---|
| NONE (NORMAL OPERATION) | FACILITY CONTROL: NORMAL OPERATION INFORMATION COMMUNICATION: NORMAL OPERATION | | |
| RANDOM FALSIFICATION | FACILITY CONTROL: NORMAL OPERATION INFORMATION COMMUNICATION: DEGENERATION A7 | | |
| RESOURCE EXHAUSTION | FACILITY CONTROL: DEGENERATION A8 INFORMATION COMMUNICATION: DEGENERATION A9 | | |
| DDoS ATTACK | | | |

| INCIDENT | FACILITY A (SET-UP CHANGE) | FACILITY B | FACILITY C |
|---|---|---|---|
| NONE (NORMAL OPERATION) | FACILITY CONTROL: NORMAL OPERATION INFORMATION COMMUNICATION: NORMAL OPERATION | | |
| RANDOM FALSIFICATION | FACILITY CONTROL: NORMAL OPERATION INFORMATION COMMUNICATION: DEGENERATION A1 | | |
| RESOURCE EXHAUSTION | FACILITY CONTROL: DEGENERATION A2 INFORMATION COMMUNICATION: DEGENERATION A3 | | |
| DDoS ATTACK | FACILITY CONTROL: DEGENERATION A4 INFORMATION COMMUNICATION: DEGENERATION A10 | | |

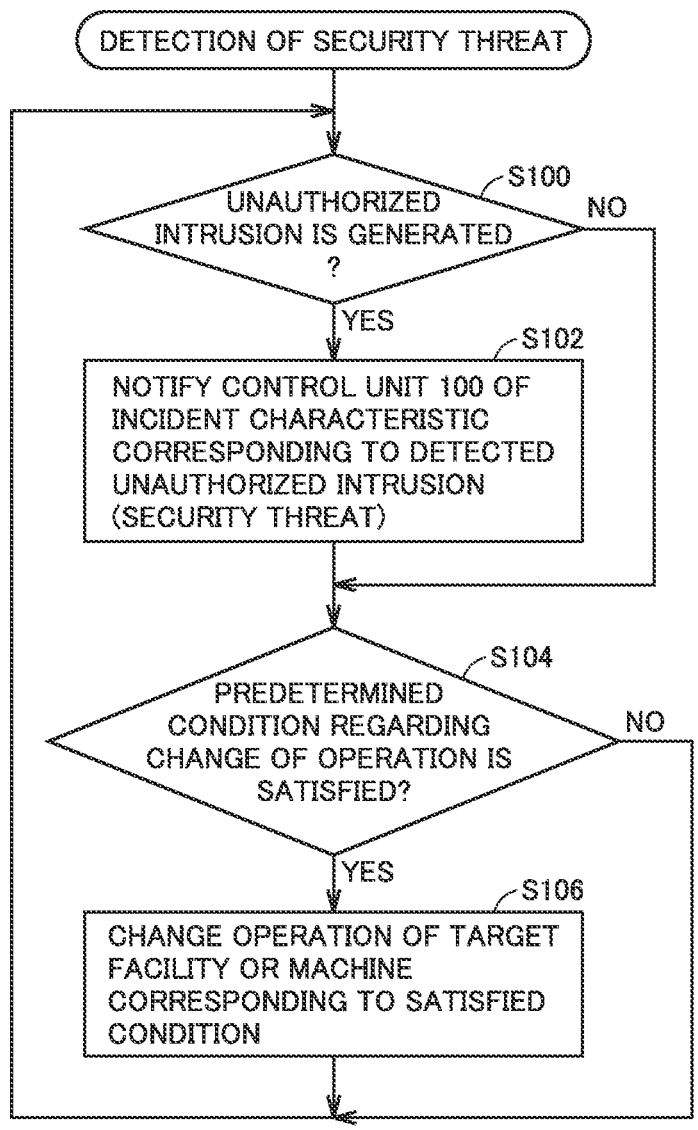

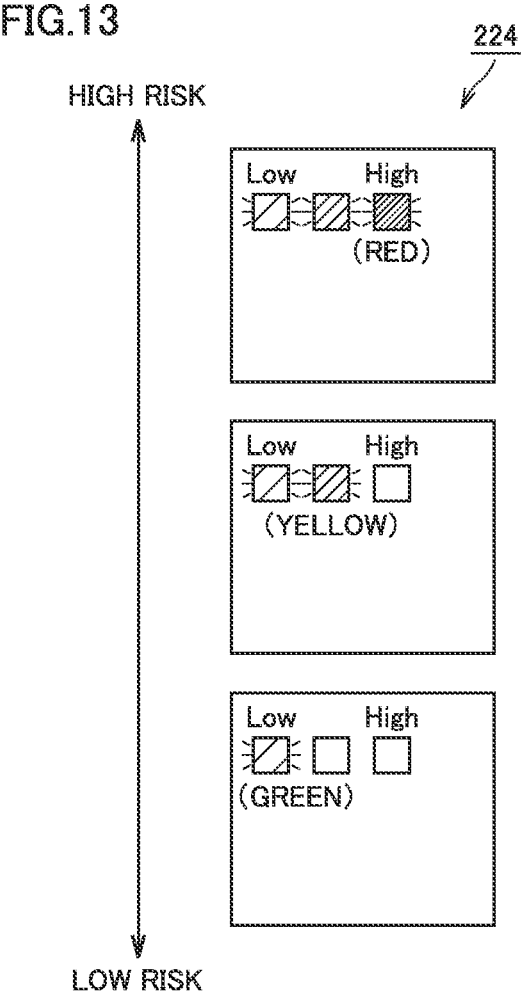

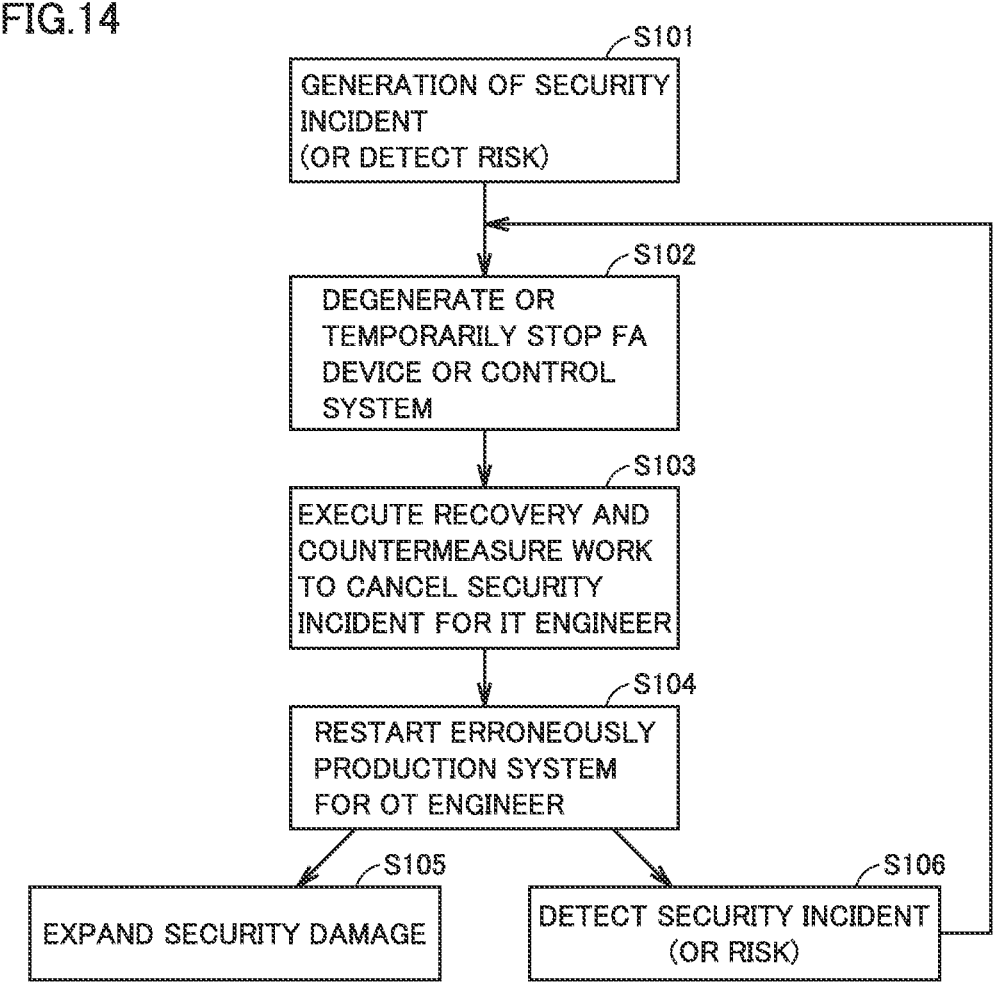

CONTROLLER SYSTEM

CROSS REFERENCE TO RELATED APPLICATIONS

This application is a National Stage of International Application No. PCT/JP2020/007802 filed Feb. 26, 2020, claiming priority based on Japanese Patent Application No. 2019-047995 filed Mar. 15, 2019, the entire contents of each of which being herein incorporated by reference in their entireties.

TECHNICAL FIELD

The present invention relates to a security function for a controller system that controls a control target.

BACKGROUND ART

A control device such as a programmable logic controller (PLC) is used to control various facilities and various devices disposed in each facility. The control device can monitor an abnormality generated in a facility or a machine of the control target, and also monitor an abnormality of the control device itself. When any abnormality is detected, a notification is given from the control device to an outside in some way.

For example, Japanese Patent Laying-Open No. 2000-137506 (PTL 1) discloses a programmable controller that transmits an e-mail to a previously designated destination when an abnormality history is registered or when predetermined time arrives.

CITATION LIST

Patent Literature

PTL 1: Japanese Patent Laying-Open No. 2000-137506

SUMMARY OF INVENTION

Technical Problem

With recent progress of information and communication technology (ICT), the control device is also network-connected to various external devices, and processing executed in the control device is also advanced. With such networking or intelligence, types of potential threats are also increasing. Accordingly, there is a need for protection of the control device and the control system against such threats. A need for reliability of protection of the control device and the control system against the threat is enhanced while there is the threat to the control device and the control system.

An object of the present invention is to enhance the reliability of the protection against the threat that may be generated with the networking or the intelligence of the control device and the control system.

Solution to Problem

According to one aspect of the present disclosure, a controller system includes: a control unit configured to execute a control operation in order to control a control target; and a security unit that is connected to the control unit and is in charge of a security function for the controller system, wherein the control unit has a normal mode and a degeneration mode in which a limited operation of the controller system is executed as a control mode regarding the control operation, and the normal mode and the degeneration mode can transition from each other, the security unit includes a detection means that detects presence or absence of an incident regarding security in the controller system, and the control unit transitions the control mode to the degeneration mode when the detection means detects the incident, and the control unit maintains the control mode in the degeneration mode until cancellation of the incident is detected by the detection means.

According to the present disclosure, the control unit operates in the degeneration mode until the incident regarding the security is canceled. The control unit can be prevented from operating in the normal mode even though the incident regarding the security is not canceled. Consequently, the reliability of the protection against the threat generated with the networking or the intelligence of the control device and the control system can be enhanced.

Preferably the control unit acquires incident information regarding the detection of the incident from the detection means, the control unit changes the control mode from the degeneration mode to the normal mode when the incident information indicates the cancellation of the incident, and the control unit sets the control mode to the degeneration mode when the incident information indicates continuation of the incident.

According to the present disclosure, the control unit can set the control mode to the normal mode or the degeneration mode based on the information from the security unit. Thus, the reliability of the protection against the threat generated with the networking or the intelligence of the control device and the control system can be enhanced.

Preferably the control unit determines the control mode based on the incident information when executing restart processing of the control unit.

According to the present disclosure, when the incident regarding the security is not canceled, the control mode is set to the degeneration mode even after the control unit is restarted. The control mode can be prevented from being set to the normal mode by the restart processing of the control unit even though the incident is not canceled.

Preferably the security unit stores information about the detection of the incident in a nonvolatile manner, the security unit returns a status of the security unit based on the information stored in the security unit when the controller system is restarted by turning on the controller system again, and the control unit sets the control mode based on the status of the security unit.

According to the present disclosure, when the incident regarding the security is not canceled, the control mode is set to the degeneration mode based on the information stored in the security unit even when the entire controller system is reset by turning on the controller system again. The control mode can be prevented from being set to the normal mode by the restart processing of the controller system even though the incident is not canceled.

Preferably the security unit changes a status of the security unit regarding the detection of the incident by prioritizing an operation from a user having administrator authority over the incident information.

According to the present disclosure, for example, when it is clear that the incident is canceled, a controller system 1 can be restored at an early stage.

Preferably, in the degeneration mode, the control unit restricts the control operation.

According to the present disclosure, the operation of the system can be maintained.

Preferably, in the degeneration mode, the control unit restricts an operation of the control target.

According to the present disclosure, the operation of the system can be maintained.

Advantageous Effects of Invention

According to the present invention, the reliability of the protection against the threat that may occur with the networking or the intelligence of the control device and the control system can be enhanced.

BRIEF DESCRIPTION OF DRAWINGS

FIG. 9 is a view illustrating an example of a control operation for each facility according to an incident characteristic in the controller system 1 of the embodiment.

FIG. 10 is a view illustrating another example of the control operation for each facility according to the incident characteristics in the controller system 1 of the embodiment.

FIG. 11 is a view illustrating an example of the control operation in each state in each facility according to the incident characteristic in the controller system 1 of the embodiment.

FIG. 12 is a flowchart illustrating a processing procedure when the security threat is detected in the controller system 1 of the embodiment.

FIG. 13 is a schematic diagram illustrating an example of an indicator adopted in the controller system 1 of the embodiment.

FIG. 14 is a view illustrating a situation assumed in recovery of a control system 10 after generation of an incident.

DESCRIPTION OF EMBODIMENTS

Figure 1:
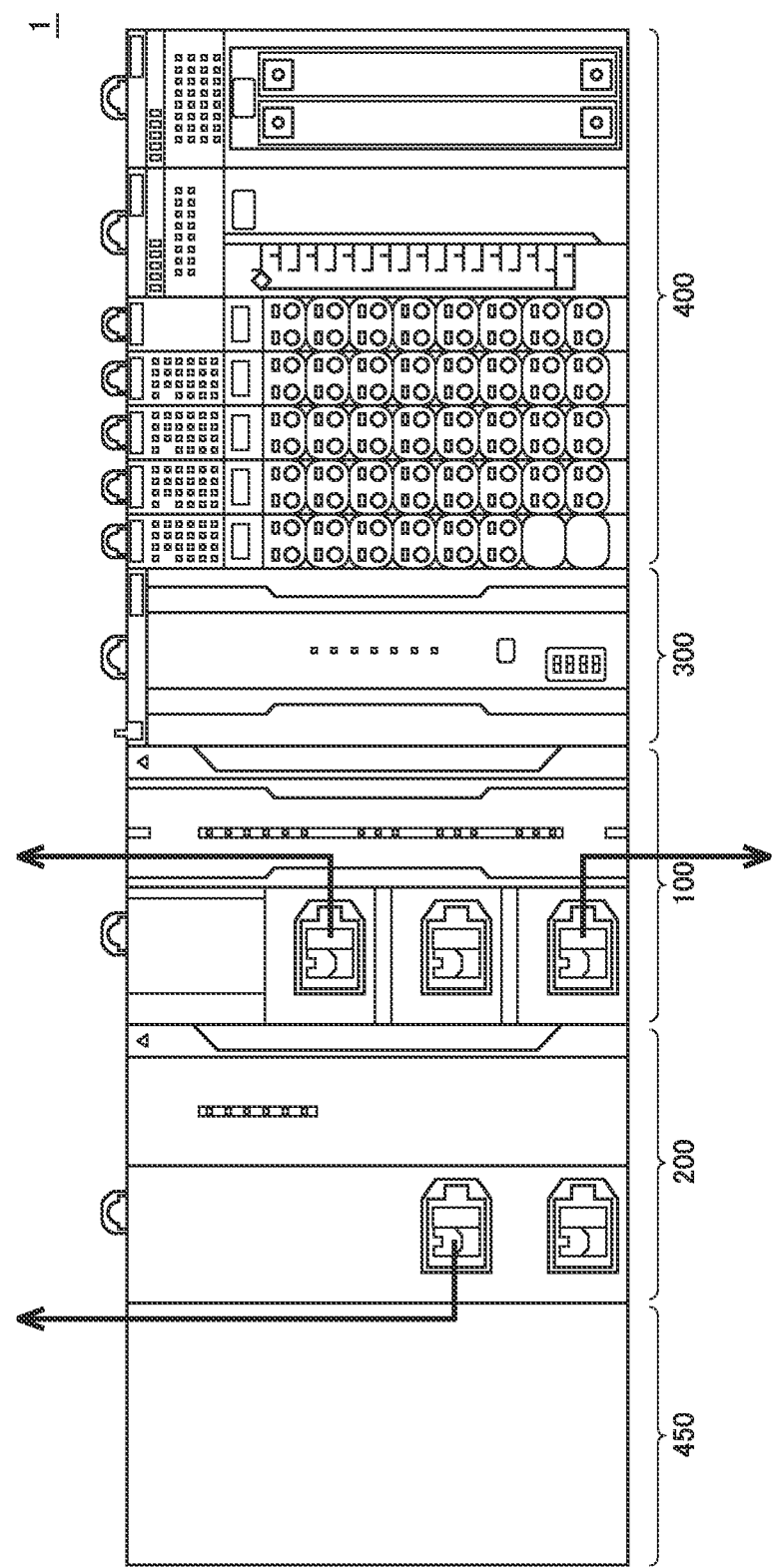
FIG. 1 is an external view illustrating a configuration example of a controller system according to an embodiment.

With reference to the drawings, an embodiment of the present invention will be described in detail. The same or equivalent portion in the drawings is denoted by the same reference numeral, and the description will not be repeated.

<A. Controller System 1>

A configuration of a controller system 1 of the embodiment will be described.

FIG. 1 is an external view illustrating a configuration example of controller system 1 of the embodiment. Referring to FIG. 1, controller system 1 includes a control unit 100, a security unit 200, a safety unit 300, one or a plurality of functional units 400, and a power supply unit 450.

Control unit 100 and security unit 200 are connected to each other through an arbitrary data transmission path (for example, PCI Express (registered trademark), Ethernet (registered trademark), or the like). Control unit 100 is connected to safety unit 300 and the one or the plurality of functional units 400 through an internal bus (not illustrated).

Control unit 100 executes a main processing in controller system 1. Control unit 100 executes a control arithmetic calculation in order to control a control target according to an arbitrarily-designed requirement specification. The control arithmetic operation executed by control unit 100 is also referred to as "standard control" in comparison with the control arithmetic operation executed by safety unit 300 described later. In the configuration example of FIG. 1, control unit 100 includes one or a plurality of communication ports.

Security unit 200 is connected to control unit 100, and is in charge of a security function for controller system 1. In the configuration example of FIG. 1, security unit 200 includes one or a plurality of communication ports. Details of the security function provided by security unit 200 will be described later.

Safety unit 300 executes the control arithmetic calculation independently of control unit 100 in order to implement a safety function regarding the control target. The control arithmetic calculation executed by safety unit 300 is also referred to as "safety control". Usually, the "safety control" is designed to satisfy a requirement implementing the safety function defined in IEC 61508 or the like. The "safety control" collectively refers to processing for preventing the safety of a person from being threatened by equipment, a machine, or the like.

Functional unit 400 provides various functions for implementing control of various control targets by controller system 1. Functional unit 400 may typically include an I/O unit, a safety I/O unit, a communication unit, a motion controller unit, a temperature adjustment unit, and a pulse counter unit. A digital input (DI) unit, a digital output (DO) unit, an analog output (AI) unit, an analog output (AO) unit, a pulse catch input unit, and a composite unit obtained by mixing a plurality of types can be cited as an example of the I/O unit. The safety I/O unit is in charge of I/O processing regarding the safety control.

Power supply unit 450 supplies power of a predetermined voltage to each unit constituting controller system 1.

<B. Hardware Configuration of Each Unit>

A hardware configuration example of each unit constituting controller system 1 of the embodiment will be described below.

(b1: Control Unit 100)

Figure 2:
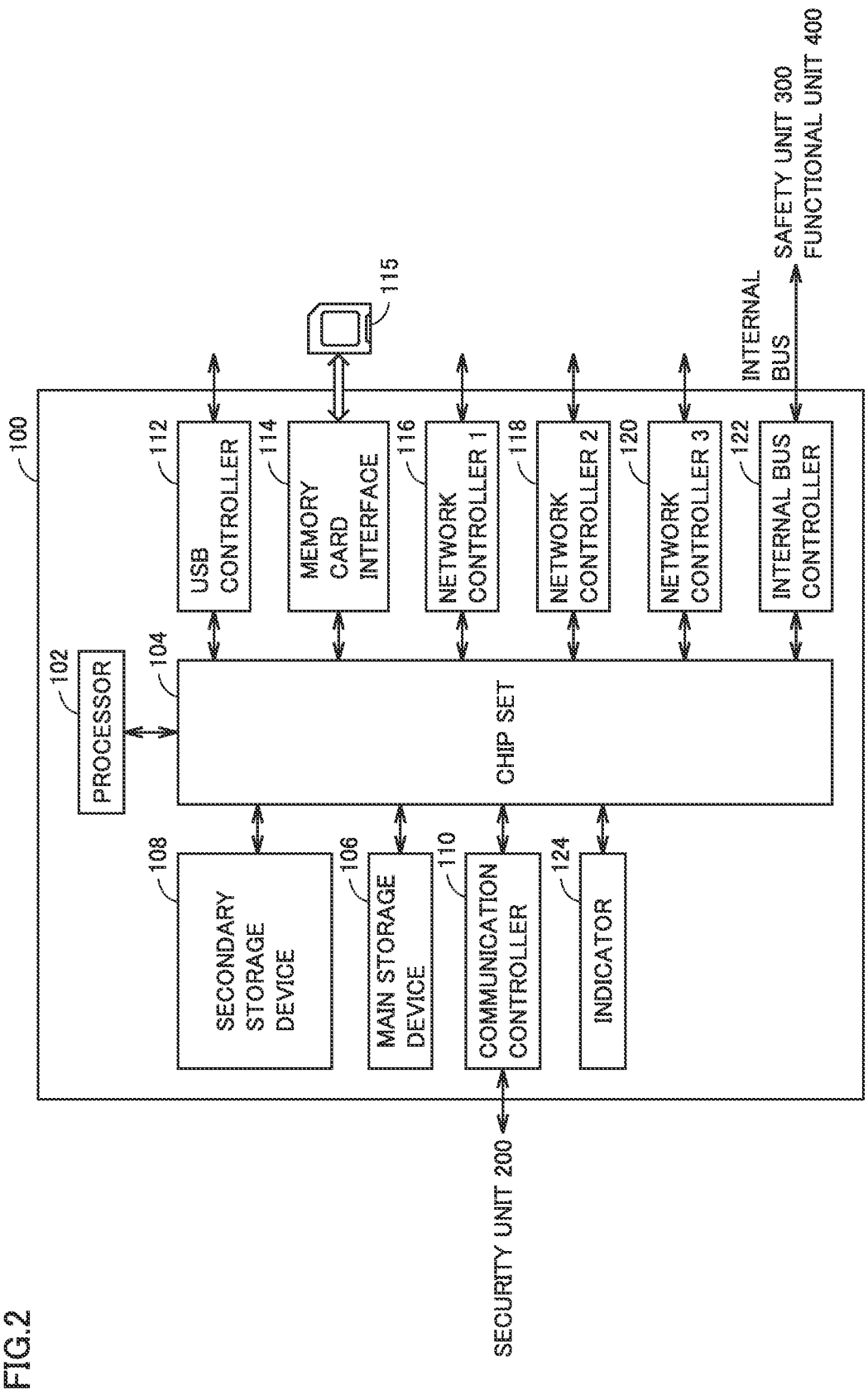
FIG. 2 is a schematic diagram illustrating a hardware configuration example of a control unit constituting the controller system of the embodiment.

FIG. 2 is a schematic diagram illustrating a hardware configuration example of control unit 100 constituting controller system 1 of the embodiment. Referring to FIG. 2, control unit 100 includes a processor 102 such as a central processing unit (CPU) or a graphical processing unit (GPU), a chip set 104, a main storage device 106, a secondary storage device 108, a communication controller 110, a universal serial bus (USB) controller 112, a memory card interface 114, network controllers 116, 118, 120, an internal bus controller 122, and an indicator 124 as main components.

Processor 102 reads various programs stored in secondary storage device 108, develops the programs in main storage device 106, and executes the programs to implement the control arithmetic calculation regarding the standard control and various pieces of processing as described later. Chip set 104 mediates exchanges of data between processor 102 and each component, thereby implementing the processing of entire control unit 100.

In addition to the system program, a control program that operates on an execution environment provided by the system program is stored in secondary storage device 108.

Communication controller 110 is in charge of the data exchange with security unit 200. For example, a communication chip compatible with PCI Express and Ethernet can be adopted as communication controller 110.

USB controller 112 is in charge of the data exchange with any information processing device through USB connection.

Memory card interface 114 is configured such that memory card 115 is detachably attached, and can write the data such as the control program and various settings in memory card 115 or read the data such as the control program and various settings from memory card 115.

Each of network controllers 116, 118, 120 is in charge of the data exchange with any device through the network. Network controllers 116, 118, 120 may adopt an industrial network protocol such as EtherCAT (registered trademark), EtherNet/IP (registered trademark), DeviceNet (registered trademark), or CompoNet (registered trademark).

Internal bus controller 122 is in charge of data exchange with safety unit 300 and the one or the plurality of functional units 400 constituting controller system 1. A communication protocol unique to a manufacturer may be used, or a communication protocol that is the same as or compliant with any of the industrial network protocols may be used as the internal bus.

Indicator 124 makes a notification of an operation state of control unit 100 and the like, and includes one or a plurality of LEDs and the like disposed on a unit surface.

Although FIG. 2 illustrates the configuration example in which necessary functions are provided by processor 102 executing the program, some or all of these provided functions may be implemented using a dedicated hardware circuit (for example, an application specific integrated circuit (ASIC) or a field-programmable gate array (FPGA)). Alternatively, a main part of control unit 100 may be implemented using hardware (for example, an industrial personal computer based on a general-purpose personal computer) according to a general-purpose architecture. In this case, a plurality of operating systems (OSs) having different uses may be executed in parallel using a virtualization technology, and necessary applications may be executed on each OS.

(b2: Security Unit 200)

Figure 3:
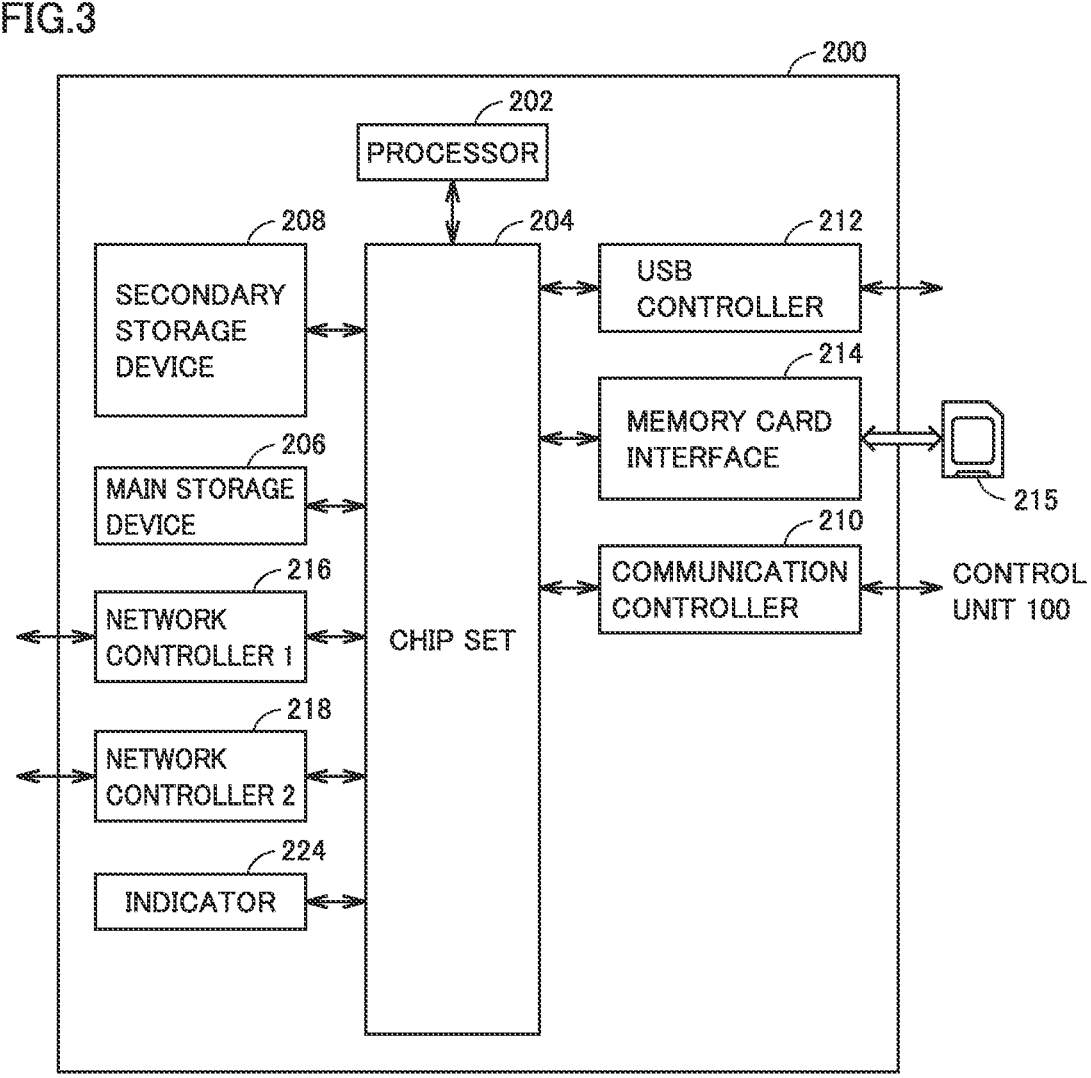
FIG. 3 is a schematic diagram illustrating a hardware configuration example of a security unit constituting the controller system of the embodiment.

FIG. 3 is a schematic diagram illustrating a hardware configuration example of security unit 200 constituting controller system 1 of the embodiment. Referring to FIG. 3, security unit 200 includes a processor 202 such as a CPU or a GPU, a chip set 204, a main storage device 206, a secondary storage device 208, a communication controller 210, a USB controller 212, a memory card interface 214, network controllers 216, 218, and an indicator 224 as main components.

Processor 202 reads various programs stored in secondary storage device 208, develops the programs in main storage device 206, and executes the programs to implement various security functions as described later. Chip set 204 mediates exchange of data between processor 202 and each component, thereby implementing processing of entire security unit 200.

In addition to the system program, secondary storage device 208 stores a security system program that operates on the execution environment provided by the system program.

Communication controller 210 is in charge of the data exchange with control unit 100. For example, similarly to control unit 100, a communication chip compatible with PCI Express, Ethernet, or the like can be adopted as communication controller 210.

USB controller 212 is in charge of the data exchange with any information processing device through the USB connection.

Memory card interface 214 is configured such that memory card 215 is detachably attached, and can write the data such as the control program and various settings in memory card 215 or read the data such as the control program and various settings from memory card 215.

Each of network controllers 216, 218 is in charge of the data exchange with any device through the network. Network controller 216, 218 may adopt a general-purpose network protocol such as Ethernet (registered trademark).

Indicator 224 makes the notification of an operation state of security unit 200 and the like, and includes one or a plurality of LEDs and the like disposed on a unit surface.

Although FIG. 3 illustrates the configuration example in which processor 202 executing the program to provide necessary functions, some or all of these provided functions may be implemented using a dedicated hardware circuit (for example, an ASIC or a FPGA). Alternatively, the main part of security unit 200 may be implemented using hardware (for example, an industrial personal computer based on a general-purpose personal computer) according to a general-purpose architecture. In this case, the plurality of OSs having different uses may be executed in parallel using a virtualization technology, and necessary applications may be executed on each OS.

(b3: Safety Unit 300)

Figure 4:
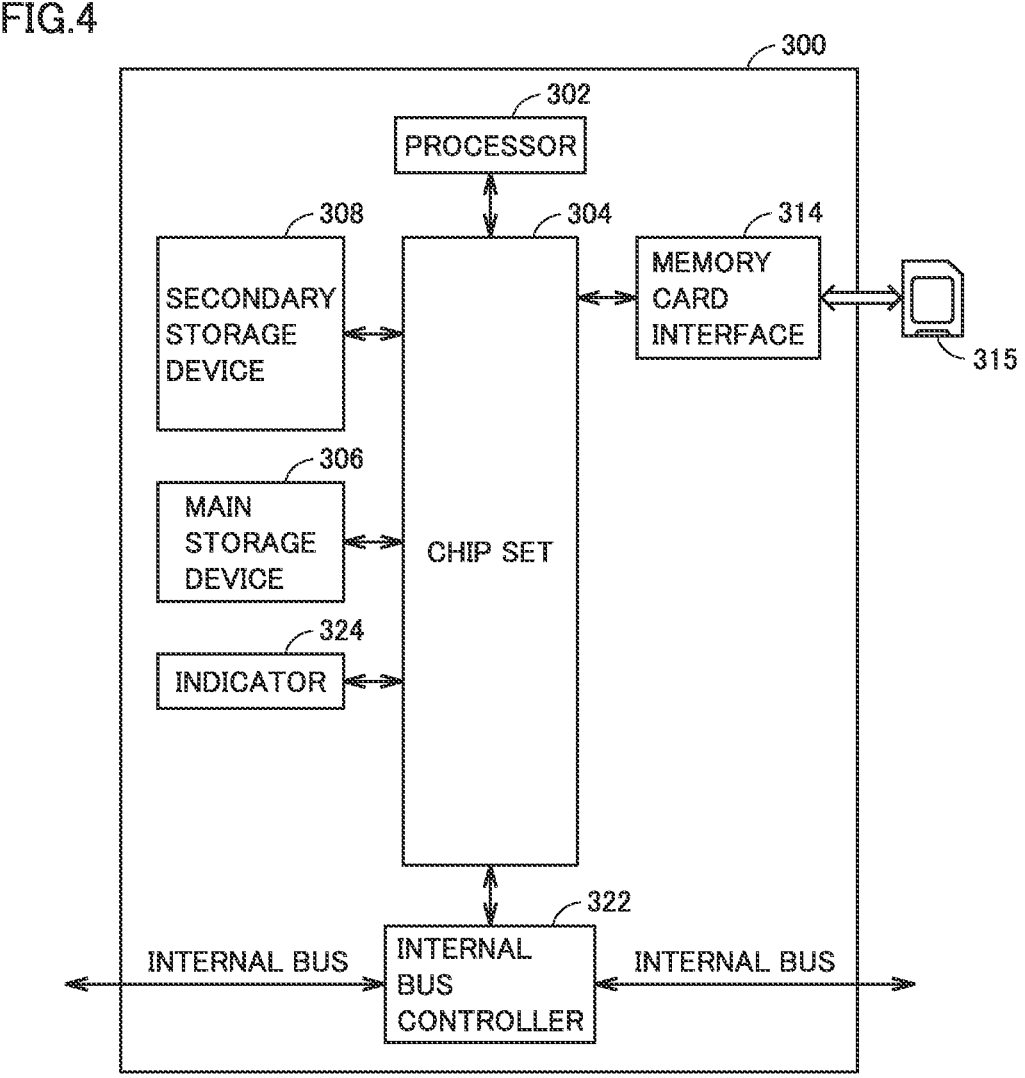
FIG. 4 is a schematic diagram illustrating a hardware configuration example of a safety unit constituting the controller system of the embodiment.

FIG. 4 is a schematic diagram illustrating a hardware configuration example of safety unit 300 constituting controller system 1 of the embodiment. Referring to FIG. 4, safety unit 300 includes a processor 302 such as a CPU and a GPU, a chip set 304, a main storage device 306, a secondary storage device 308, a memory card interface 314, an internal bus controller 322, and an indicator 324 as main components.

Processor 302 reads various programs stored in secondary storage device 308, develops the programs in main storage device 306, and executes the programs to implement the control arithmetic calculation regarding the safety control and various pieces of processing as described later. Chip set 304 mediates exchange of data between processor 302 and each component, thereby implementing processing of entire safety unit 300.

In addition to the system program, a safety program that operates on an execution environment provided by the system program is stored in secondary storage device 308.

Memory card interface 314 is configured such that memory card 315 is detachably attached, and can write the data such as the safety program and various settings in memory card 315 or read the data such as the safety program and various settings from memory card 315.

Internal bus controller 322 is in charge of the data exchange with control unit 100 through the internal bus.

Indicator 324 makes the notification of an operation state of safety unit 300 and the like, and includes one or a plurality of LEDs and the like disposed on a unit surface.

Although FIG. 4 illustrates the configuration example in which processor 302 executing the program to provide necessary functions, some or all of these provided functions may be implemented using a dedicated hardware circuit (for example, an ASIC or a FPGA). Alternatively, the main part of safety unit 300 may be implemented using hardware (for example, an industrial personal computer based on a general-purpose personal computer) according to a general-purpose architecture. In this case, the plurality of OSs having different uses may be executed in parallel using a virtualization technology, and necessary applications may be executed on each OS.

<C. Control System 10>

Figure 5:
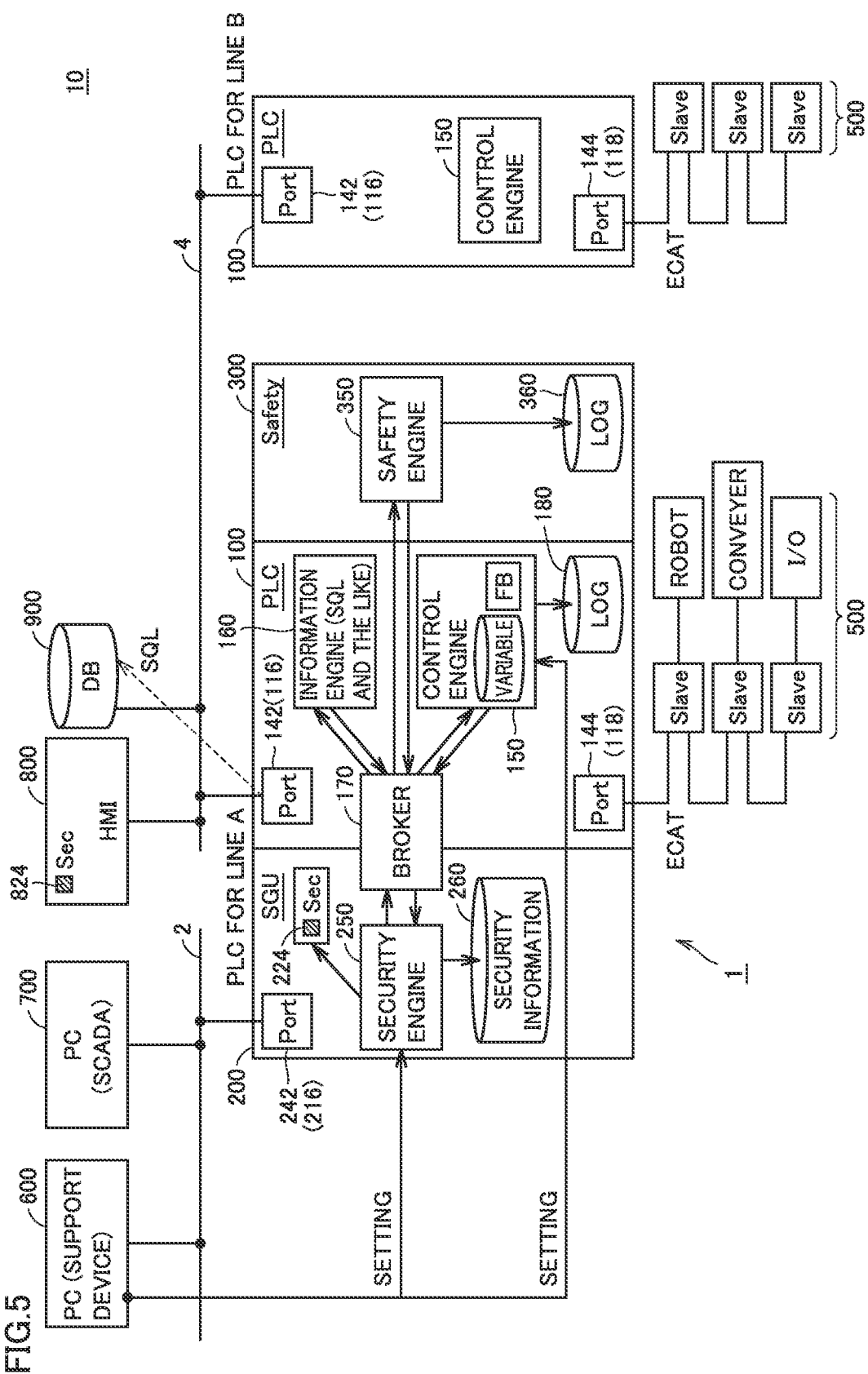
FIG. 5 is a schematic diagram illustrating a typical example of a control system including the controller system of the embodiment.

A typical example of a control system 10 including controller system 1 of the embodiment will be described below. FIG. 5 is a schematic diagram illustrating a typical example of control system 10 including controller system 1 of the embodiment.

As an example, control system 10 in FIG. 5 sets two lines (line A and line B) as the control target. Typically, it is assumed that a robot capable of giving arbitrary physical action to a workpiece on a conveyor that conveys the workpiece is disposed in each line in addition to the conveyor.

Control unit 100 is disposed in each of line A and line B. In addition to control unit 100 in charge of line A, security unit 200 and safety unit 300 constitute controller system 1. For convenience of description, functional unit 400 and power supply unit 450 are not illustrated in FIG. 5.

Security unit 200 of controller system 1 is connected to a first network 2 through a communication port 242 (network controller 216 in FIG. 3). It is assumed that a support device 600 and a supervisory control and data acquisition (SCADA) device 700 are connected to first network 2.

Support device 600 is capable of accessing at least control unit 100, and provides functions such as production, debugging, and setting of various parameters of a program executed by each unit included in controller system 1 to a user.

SCADA device 700 presents various types of information obtained by the control arithmetic calculation in controller system 1 to an operator, and generates an internal command or the like for controller system 1 according to an operation from the operator. SCADA device 700 also has a function of collecting data handled by controller system 1.

Control unit 100 of controller system 1 is connected to a second network 4 through a communication port 142 (network controller 116 in FIG. 2). It is assumed that a human machine interface (HMI) 800 and a database 900 are connected to second network 4.

HMI 800 presents various types of information obtained by the control arithmetic calculation in controller system 1 to the operator, and generates an internal command or the like for controller system 1 according to the operation from the operator. Database 900 collects various data (for example, information about traceability measured from each workpiece) transmitted from controller system 1.

Control unit 100 of controller system 1 is connected to the one or the plurality of field devices 500 through communication port 144 (network controller 118 of FIG. 2). Field device 500 includes a sensor and detector that collect various types of information necessary for the control arithmetic calculation from the control target, an actuator that gives some action to the control target, and the like. In the example of FIG. 5, field device 500 includes a robot that gives some external action to the workpiece, the conveyor that conveys the workpiece, and the I/O unit that exchanges a signal with the sensor or the actuator disposed in the field.

Similarly, control unit 100 in charge of line B is connected to one or a plurality of field devices 500 through communication port 144 (network controller 118 in FIG. 2).

Focusing on a functional aspect of controller system 1, control unit 100 includes a control engine 150 that is a processing execution unit that executes control arithmetic calculation regarding standard control and an information engine 160 that exchanges data with an external device. Security unit 200 includes a security engine 250 that implements security functions as described below. Safety unit 300 includes a safety engine 350 that is a processing execution unit that executes the control arithmetic calculation regarding the safety control.

Each engine is implemented by an arbitrary hardware element such as a processor of each unit, an arbitrary software element such as various programs, or a combination of these elements. Each engine can be mounted on any form.

Controller system 1 further includes a broker 170 that mediates exchange between engines. An entity of broker 170 may be disposed in one or both of control unit 100 and security unit 200.

Control engine 150 holds a variable table, a function block (FB), and the like necessary for the execution of the control arithmetic calculation controlling the control target. Each variable stored in the variable table is periodically collected with a value acquired from field device 500 by I/O refresh processing, and each value is periodically reflected to field device 500. A log of the control arithmetic calculation in control engine 150 may be stored in a log database 180.

Information engine 160 executes arbitrary information processing on data (a variable value held in the variable table) held by control unit 100. Typically, information engine 160 includes a processing of periodically transmitting the data held by control unit 100 to database 900 and the like. SQL or the like is used for the transmission of such data.

Security engine 250 executes detection of an unauthorized intrusion generated in controller system 1, processing corresponding to the detected unauthorized intrusion, determination of the generation of the incident, processing corresponding to the generated incident, and the like. Behavior of security engine 250 is stored as security information 260. Accordingly, security engine 250 corresponds to the detection means that detects presence or absence of the incident regarding security.

Security engine 250 makes the notification that some event regarding security is generated or a level of the event regarding the generated security using indicator 224.

Safety engine 350 corresponds to the detection means that detects whether any unauthorized intrusion is generated in controller system 1. Safety engine 350 acquires and reflects the safety I/O variable necessary for executing the control arithmetic calculation regarding the safety control through control unit 100. The log of the safety control in safety engine 350 may be stored in a log database 360.

For example, when security engine 250 detects some event, broker 170 changes operations of control engine 150, information engine 160, and safety engine 350.

<D. Countermeasure Cycle Against Security Threats>

Controller system 1 of the embodiment is capable of detecting any security threat that prevents normal operation of equipment and a machine, and executing necessary measures.

In the specification, the "security threat" means any event that prevents the normal operation of the equipment or the machine. At this point, the "normal operation" means a state in which the equipment and the machine can be continuously operated as designed in the system and as planned in the production plan. A concept of the "normal operation" includes attached processing such as start-up, maintenance, and set-up change of equipment and machines in order to continue the operation of the equipment and machines as designed in the system and as planned in the production plan.

In the control device mainly including the PLC, the security threats from four aspects are typically considered: (1) attack from a host device such as a database; (2) attack from a field device; (3) attack through a support device; and (4) attack through a storage medium attached to the control device such as a memory card. Furthermore, there is a security risk that all physical ports mounted on the control device are attacked.

Security unit 200 of the embodiment detects the security threat or a risk generated in each of these aspects, and executes processing for enabling the execution of a necessary countermeasure.

Typically, the security threat evolves sequentially, and countermeasures against the security threat need to be continuously executed. The continuous countermeasures against such the security threat will be described.

Figure 6:
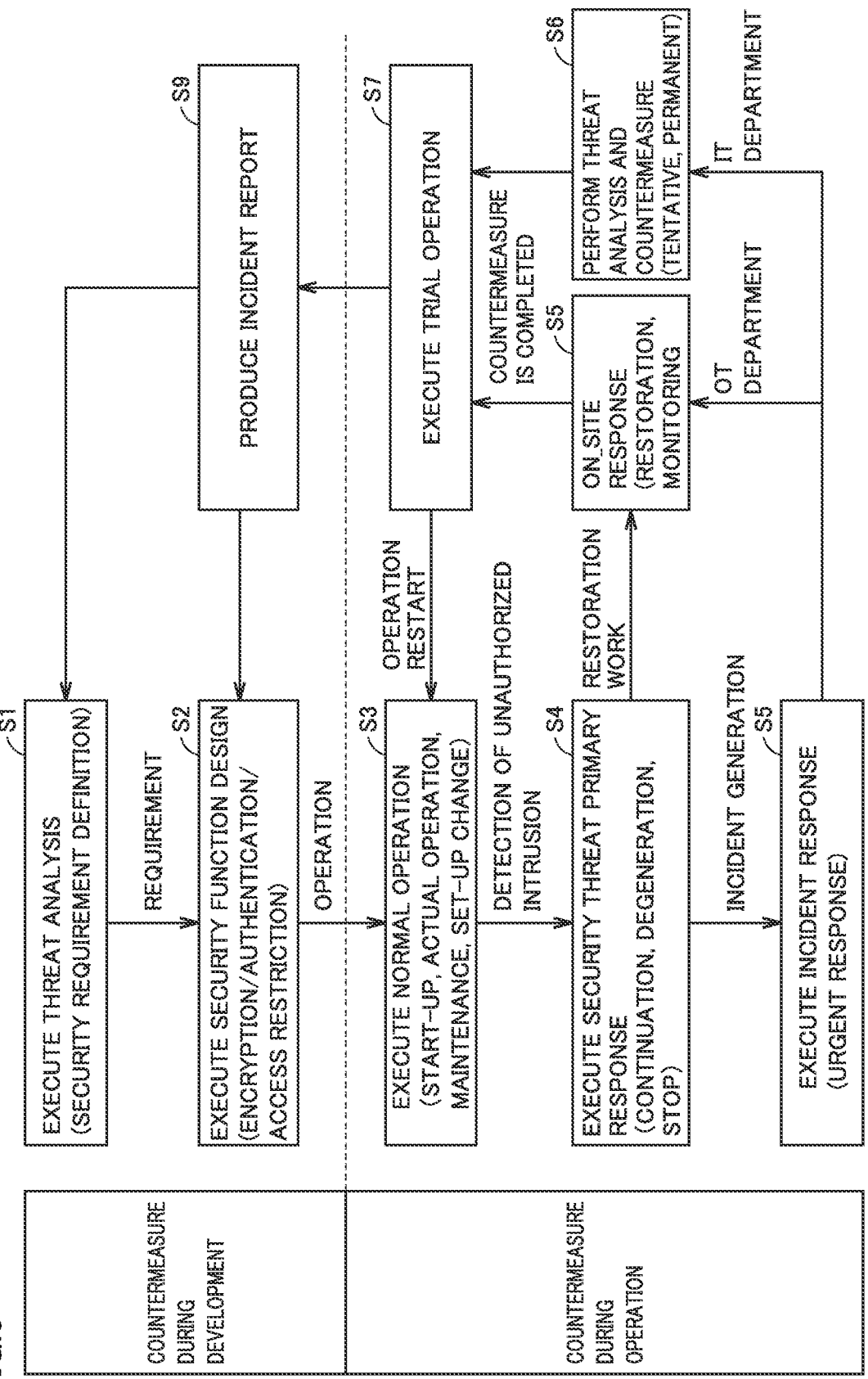
FIG. 6 is a schematic diagram illustrating an example of a countermeasure cycle against a security threat.

FIG. 6 is a schematic diagram illustrating an example of a countermeasure cycle against the security threat. Referring to FIG. 6, the countermeasure cycle against the security threat is mainly roughly divided into (1) countermeasures during development (steps S1, S2, S9) and (2) countermeasures during operation (steps S3 to S8). (1) The countermeasure during the development mainly means the countermeasure at the stage of determining the design and specification of the facility or machine of the control target, and (2) the countermeasure during the operation mainly means the countermeasure at the stage of operating the facility or machine of the control target.

More specifically, first, threat analysis is executed on the equipment or machine of the control target (step S1). In the threat analysis in step S1, a security requirement definition is determined. Subsequently, security function design is executed (step S2). In the security function design, security functions such as an encryption scheme, an authentication scheme, and access restriction are designed.

The operation is started after the contents designed in steps S1 and S2 are reflected in the facility or machine of the control target. At this point, a normal operation is normally executed (step S3). As described above, the normal operation includes processing such as start-up, actual operation, maintenance, and set-up change of the equipment or machine.

It is assumed that some kind of unauthorized intrusion is detected during the normal operation. Then, a security threat primary response is executed (step S4).

At this point, in the specification, the "detection of the unauthorized intrusion" or the "unauthorized intrusion detection" means the detection of a phenomenon or abnormality that may become some security threat. In other words, the detection of the unauthorized intrusion only means the detection of the generation of the phenomenon or the state different from the normal operation, and whether the normal incident is not generated (however, there is a risk of generation of the incident) and whether the phenomenon or the state different from the normal operation is unauthorized cannot be reliably determined. For this reason, it is not preferable to block all pieces of processing and events only by detecting the unauthorized intrusion from the viewpoint of maintaining production activities.

For this reason, in the cycle of countermeasures against the security threat in FIG. 6, when the unauthorized intrusion is detected, the security threat primary response is executed as a primary measure (step S4).

The security threat primary response is the primary measure in the situation where there is a risk of incident generation, and sometimes there is the case where progress to incident generation can be prevented. Even when the incident is generated, damage can be minimized by executing the security threat primary response. In controller system 1 of the embodiment, the security threat primary response is automatically executed by a previous setting.

Typically, the security threat primary response can be roughly divided into three types of continuation, degeneration, and stop.

"Continuation" of the security threat primary response means that the operation is continued similarly to immediately before the unauthorized intrusion is detected. However, preferably the notification of the security threat is performed by an alarm or the like such that a further response can be promptly taken.

The "degeneration" corresponding to the security threat primary response means that the controller system continues to operate in a limited manner, such as partial stop (only partial operation), performance reduction (performance degradation), and functional restriction. That is, in the "degeneration", the operation itself continues while being subjected to some sort of limitation in terms of hardware or software as compared with the operation immediately before the unauthorized intrusion is detected.

The "degeneration" of the security threat primary response may also include general degeneration operation (fallback). Such a general shrinking operation means that the operation is maintained while the function and performance of the system are partially stopped. After the system is switched to the degeneration operation, there are many cases where the available functions are minimized or a response speed decreases. Consequently, the "degeneration" may either restrict the control operation of control unit 100 or restrict the operation of the control target.

The "stop" of the security threat primary response means that the operation of the system is safely stopped.

After the security threat primary response is executed, recovery work is executed. In control system 10 of FIG. 5, a worker of an operation technology (OT) department is in charge of controller system 1 and the field side of controller system 1, and a worker of an information technology (IT) department is in charge of an upper side of controller system 1 (first network 2 and second network 4 and the devices connected to the respective networks).

More specifically, the worker of the OT department executes necessary processing on the facility or machine of the control target (on-site response) (step S5). Specifically, the work such as the recovery work and monitoring of the facility or machine is executed. On the other hand, the worker of the IT department performs threat analysis and countermeasures against the generated security threat (step S6). The countermeasures by the worker of the IT department may include provisional and permanent.

When the countermeasures by the workers of the OT department and the IT department are completed, a trial operation is executed (step S7). When there is no problem in the trial operation, the operation is restarted and returns to the normal operation (step S3).

On the other hand, when the incident is generated although the security threat primary response is executed (step S4), the incident response is executed (step S8). The incident response is the response after the incident is generated, and includes a measure that is urgently executed to restore the site or limit an area of influence. In controller system 1 of the embodiment, the incident response is also automatically executed by the previous setting.

After the incident response is executed, the worker of the OT department executes necessary processing on the equipment and machine of the control target (on-site response) (step S5), and the worker of the IT department performs threat analysis and countermeasure against the generated security threat (step S6). Furthermore, an incident report is produced (step S9), and the threat analysis (step S1), the security function design (step S2), and the like are executed again based on the content of the produced incident report.

In this manner, when the incident is generated, the content of the generated incident is fed back to the development stage.

The incident report may be produced even when the incident is not generated.

As described later, controller system 1 of the embodiment provides a mechanism capable of reliably executing the countermeasure cycle against the security threat in FIG. 6.

<E. Security Threat Primary Response>

Security threat primary response (step S4) in FIG. 6 will be described below.

(e1: Security Threat Primary Response in Control System 10)

First, an example of detection of an unauthorized intrusion (security threat) generated in control system 10 and the security threat primary response will be described.

Figure 7:
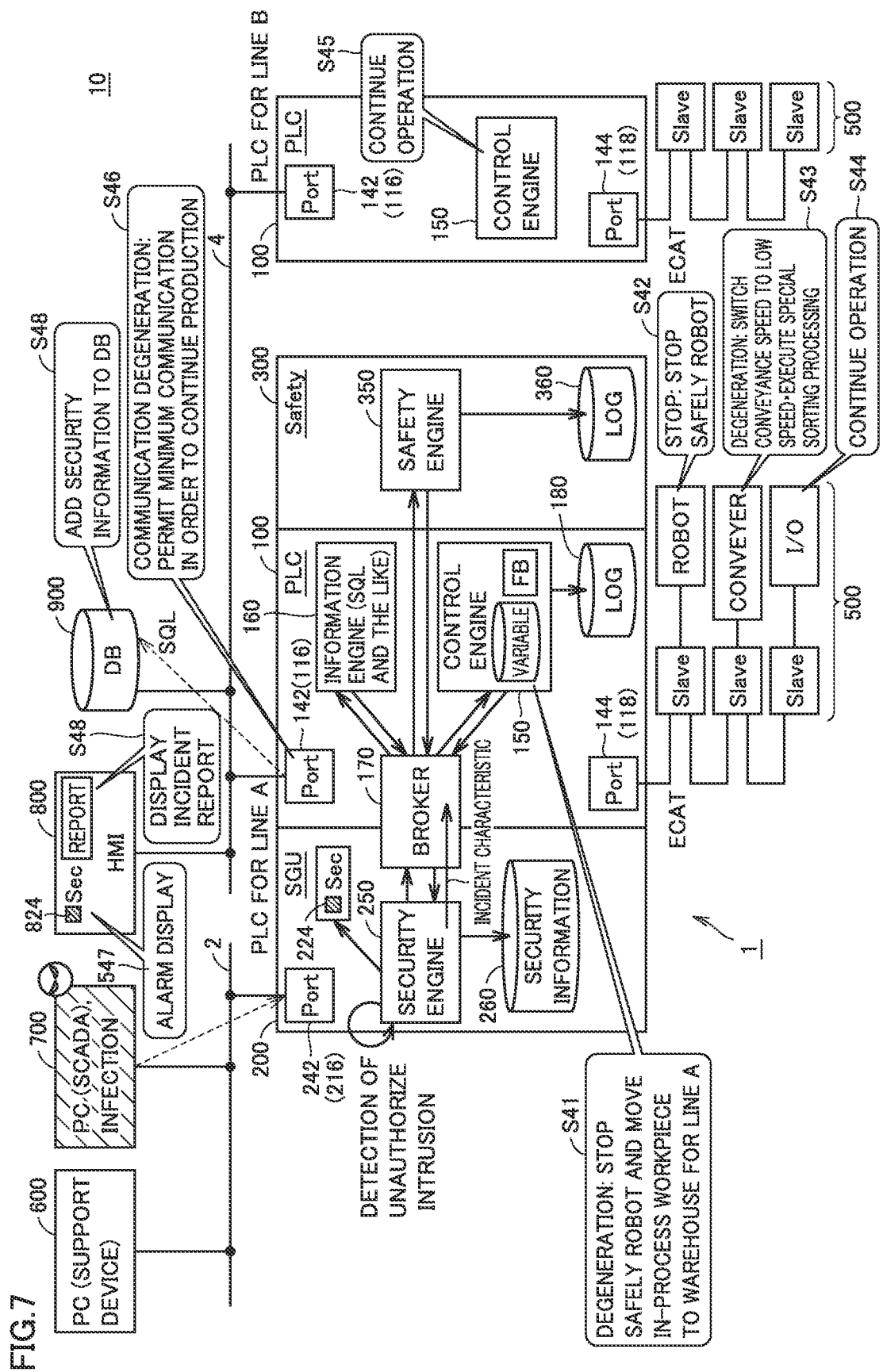
FIG. 7 is a schematic diagram illustrating an example of a response at time of unauthorized intrusion detection in the control system including a controller system 1 of the embodiment.

FIG. 7 is a schematic diagram illustrating an example of the response at time of unauthorized intrusion detection in control system 10 including controller system 1 of the embodiment. FIG. 7 illustrates an example in which SCADA device 700 is infected with a virus and attacked from first network 2 and communication port 242 of security unit 200 in control system 10 of FIG. 5.

In the example of FIG. 7, it is assumed that only controller system 1 in charge of line A is attacked, and there is no attack on control unit 100 in charge of line B. When detecting the unauthorized intrusion, security unit 200 notifies control unit 100 and the like of the incident characteristic of the detected unauthorized intrusion.

In the specification, the "incident characteristic" is a term including an attribute (for example, the attack type, the attack characteristic, the attack level, the severity, and the urgency) of the detected unauthorized intrusion (security threat). Security engine 250 of security unit 200 determines the incident characteristic of the detected unauthorized intrusion (security threat) based on a predetermined detection logic, and outputs the incident characteristic to control unit 100 and the like. That is, security engine 250 of security unit 200 functions as a notification unit that notifies control unit 100 of the incident characteristic indicating the attribute of the unauthorized intrusion detected by the detection function.

Control unit 100 executes the security threat primary response and/or the incident response according to the incident characteristic from security unit 200. That is, control unit 100 changes the control operation according to the incident characteristic made notification from security engine 250 of security unit 200.

FIG. 7 illustrates an example in which the security threat primary response is executed. Specifically, a line A on which a workpiece conveyed on a conveyor is machined by a robot is assumed. In the line A, when the unauthorized intrusion is detected, as an example, processing for safely stopping the robot that machines the workpiece and evacuating an in-process workpiece on a conveyor to a warehouse is executed as the security threat primary response.

In order to implement the security threat primary response, control engine 150 of control unit 100 safely stops the robot while executing processing for moving the in-process workpiece on the conveyor to the warehouse for the line A (step S41). In accordance with an instruction output by the control engine 150, the robot of the field device 500 safely stops (stops) (step S42), the conveyor of the field device 500 switches the conveyance speed to a low speed, and executes (degenerates) special sorting processing for moving the in-process workpiece to the warehouse (step S43). On the other hand, the I/O unit of field device 500 continues the operation (step S44). This is because the input and output data periodically updated by the I/O unit is required for control engine 150 to appropriately execute the processing.

As described above, because the attack from SCADA device 700 in FIG. 7 does not affect control unit 100 in charge of line B, control engine 150 of control unit 100 in charge of line B continues to operate (step S45).

For communication port 142 of control unit 100, only minimum communication may be permitted in order to continue the production (step S46). That is, communication of a communication physical port of control unit 100 may be controlled. The communication of not only the communication physical port of control unit 100 but also any communication physical port of security unit 200 and/or safety unit 300 may be restricted when any unauthorized intrusion (security threat) is detected.

In addition, control unit 100 displays an alarm indicating that the unauthorized intrusion (security threat) is detected on indicator 824 of HMI 800 (step S47).

Furthermore, control unit 100 may display the incident report on HMI 800 when receiving the generation of the incident from security unit 200 (step S48).

As illustrated in FIG. 7, when detecting the unauthorized intrusion (security threat), controller system 1 can execute the security threat primary response according to the incident characteristic of the detected unauthorized intrusion.

(e2: Security Threat Primary Response in Other Equipment and Machines)

In FIG. 7 described above, a primary response to a security threat in a case where an attack is received from the SCADA device in the control system 10 in which a line in which a robot capable of giving an arbitrary physical action to a workpiece on a conveyor is arranged is set as a control target has been exemplified. However, in the security threat primary response, it is preferable to make the response contents different depending on at least the facilities and machines included in the control target and the incident characteristic.

(i) Attack of Data Falsification on Processing Machine

For example, it is assumed that machining data (data defining a finished shape or the like) is falsified with respect to a machining machine of the workpiece by numerical control (NC) or the like. In this case, with respect to the control of the processing machine and peripheral equipment of the processing machine, the stop is adopted as the security threat primary response, and human safety is prioritized.

On the other hand, the security threat primary response, in which the communication is interrupted and isolated from other facilities (information communication processing) and the workpiece processed after being subjected to the attack of the data falsification is specified (information processing), is basically adopted with respect to the information communication processing.

(ii) DDoS Attack on Filling Machine

For example, a distributed denial of service (DDoS) attack against a liquid filling machine (bottling machine) of a can, a bottle, or the like is assumed. Because the filling machine is typically performing a filling operation at high speed, the sudden stop may cause problems in terms of damage to the equipment and post-processing of cans or bottles during filling. On the other hand, the DDoS attack only affects the communication with the outside, and the filling machine itself can be often operated. Accordingly, the filling machine takes the security threat primary response such as the normal operation or the degeneration operation (for example, the conveyance speed is gradually decreased).

On the other hand, the security threat primary response, in which the communication is interrupted and isolated from other equipment (communication processing) and the workpiece processed after being attacked by the data falsification is specified (information processing), is basically adopted with respect to the information communication processing in control unit 100.

On the other hand, processing for receiving information (that is, the target of the DDoS attack) is blocked and processing for transmitting the information (for example, the transmission of production information to a host server) is continuously enabled with respect to the information communication processing.

In this manner, it is preferable to make the response contents different depending on the facilities and machines included in the control target and the incident characteristic.

<F. Response According to Incident>

The incident response (step S8) in FIG. 6 will be described below.

Figure 8:
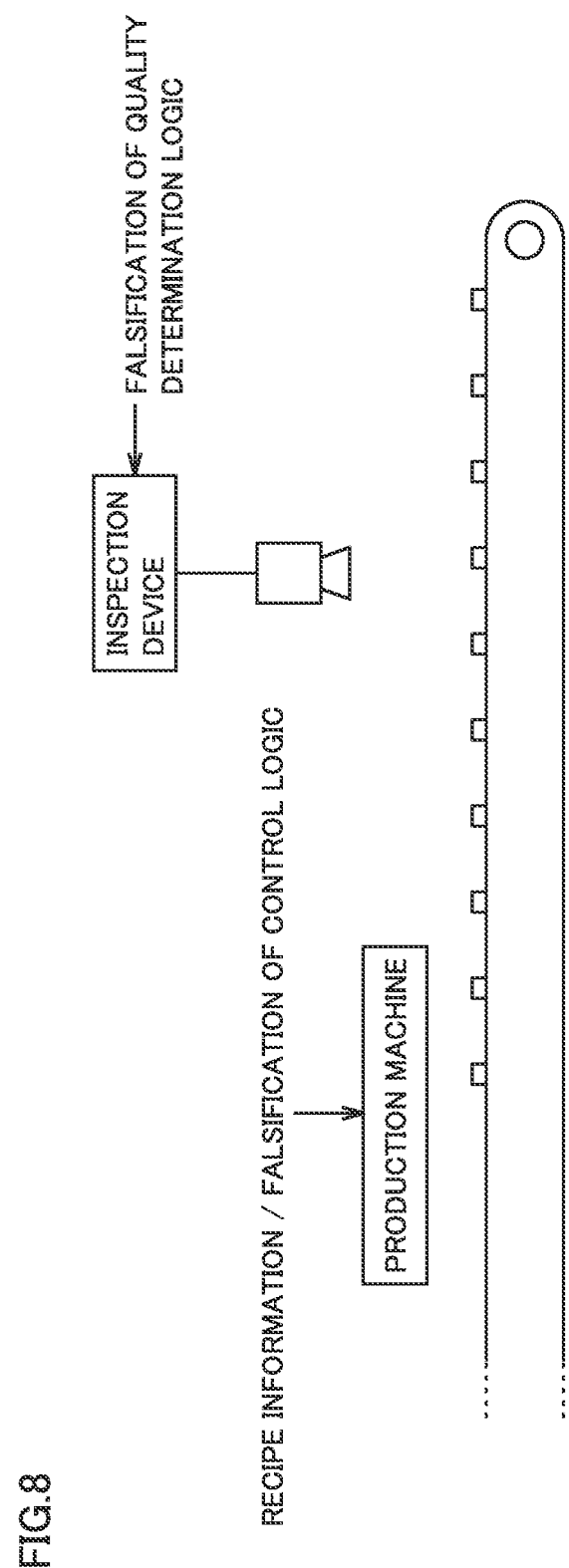
FIG. 8 is a schematic diagram illustrating an attack example on a line including a production machine and an inspection device.

FIG. 8 is a schematic diagram illustrating an attack example on a line including a production machine and an inspection device. Referring to FIG. 8, for example, a line in which the production machine produces the product and the product produced by the production machine is inspected by the inspection device disposed on a downstream side of the production machine and then shipped is assumed.

It is assumed that the attacker intends to leak defective products to the market for the line. In order to implement the idea, the attacker falsifies the production machine such that the production machine produces the defective product, and further falsifies an inspection device such that the inspection device does not detect the defective product.

As a specific content of the attack, for example, a quality determination logic is falsified for the inspection device. That is, the attack of intentionally rewriting the quality determination logic is performed such that the inspection device does not determine the defective product.

In addition, recipe information and/or control logic is falsified for the production machine. That is, the attack such as changing the control content such that the production machine produces the defective product is made.

When the attack is received, the incident is generated, and the response according to the incident is required. With respect to the response according to the incident, it is preferable to change the response content according to the incident characteristic.

In this case, the following is assumed as the specific response to the incident.

Switch to another inspection device is performed with no use of the possibly-falsified inspection device (the inspection device is made redundant or the product is flown to the safe inspection device on another line)

Logic before falsification (the quality determination logic or the control logic) is backed up and automatic restoration is performed (by automatically restoring, the end user does not need to take the backup on regular basis, and which past backup can be determined to be safe can be specified)

The production of a process where the risk can exist is stopped, and the production is continued for other processes where the risk does not exist (the number of in-process workpiece increases, but it is not necessary to stop all processes.)

Because the quality determination result of the already produced product is also suspicious, the product is not stored in a proper warehouse, but is inspected again, and is not distributed to the market as it is (the inspection may be caused to flow to a line for reinspection or may be manually reinspected).

As described above, in the embodiment, because the incident characteristic of the detected unauthorized intrusion (security threat) can be used, for example, when it can be ensured that the quality determination of the product is appropriately executed, it is not necessary to completely stop the production line. In addition, when the products to be reinspected can be narrowed down, the spread of damage such as the collection of all products can be avoided.

<G. Response According to Incident Characteristic>

As described above, in controller system 1 of the embodiment, when detecting the unauthorized intrusion (security threat), security unit 200 notifies control unit 100 and the like of the incident characteristic of the detected unauthorized intrusion (security threat) (see FIG. 7 and the like). In control unit 100 and safety unit 300, an appropriate range and content to the security threat can be responded based on the incident characteristic (steps S4 and S8 in FIG. 6).

Controller system 1 of the embodiment can vary contents of control (that is, the security threat primary response or the incident response) in control unit 100 and/or safety unit 300 according to the incident characteristic of the detected unauthorized intrusion (security threat). A determination example of the control content according to the incident characteristic will be described below.

FIG. 9 is a view illustrating an example of the control operation for each facility according to the incident characteristic in controller system 1 of the embodiment. FIG. 10 is a view illustrating another example of the control operation for each facility according to the incident characteristic in controller system 1 of the embodiment. FIG. 11 is a view illustrating an example of control operation for each state in each facility according to the incident characteristic in controller system 1 of the embodiment.

FIG. 9 illustrates the example in which the type of attack or the state after the attack (for example, random falsification, resource exhaustion, and DDoS attack) is output from security unit 200 as the incident characteristic. The response according to each incident characteristic output from security unit 200 is executed. The response according to the incident characteristic may be set more finely for each facility or machine.

The response in accordance with the incident characteristic can be roughly classified into the response for the facility control and the response for the information communication. The facility control mainly means processing executed by control engine 150 of control unit 100 and/or safety engine 350 of safety unit 300 (see FIG. 5), and means the response to the operation of the facility or the machine of the control target. The information communication mainly means processing executed by information engine 160 of the control unit 100, and means correspondence for data exchange between control unit 100 and the external device, handling of information inside control unit 100, and the like.

In the control operation of FIG. 9, the "normal operation" means the state in which the operation of the facility or machine can be continued in accordance with the system design and the production plan. The "degeneration" (in FIG. 9, the "degeneration" is expressed while identification information such as "A1" is added) means that controller system 1 continues limited operation such as partial stop (only partial operation), performance reduction (performance degradation), and functional restriction. The "stop" means that the operation of the target equipment, machine, or controller system 1 is safely stopped. The same applies to FIGS. 10 and 11.

FIG. 10 illustrates an example in which a level (severity, urgency, or the like) of the detected intrusion (security threat) is output from security unit 200 as the incident characteristic. Each level is calculated based on the type of the detected attack, the state after the attack, or the like. The response according to each incident characteristic output from security unit 200 is executed. The response according to the incident characteristic may be set more finely for each facility or machine.

FIG. 11 illustrates an example in which the response in accordance with each incident characteristic is set for each state of each facility or machine. For example, the state such as during operation, during maintenance, or during set-up change may be specified for each facility, and the response to each facility may be determined based on the detected incident characteristics and the current state.

Although FIG. 11 illustrates the states of the equipment and the machine, the present invention is not limited thereto, and for example, the corresponding contents may be changed in accordance with the operation state (during normal driving, during remote access, during debug, and the like) of the PLC. Furthermore, the response in accordance with each incident characteristic may be determined based on only the state. That is, the response may be determined based on only the state when the security threat is detected regardless of the difference between the equipment or the machines.

In addition, the level in FIG. 10 may be used as the incident characteristic in FIG. 11.

As illustrated in FIGS. 9 to 11, controller system 1 of the embodiment can dynamically determine the necessary response for each facility and/or each state in accordance with the incident characteristic output from security unit 200. The maintenance of the productivity by continuing the operation of facilities or machines and the response to the security can be flexibly executed by dynamically determining the content of the response. Although the control operation regarding the standard control is illustrated in FIGS. 9 to 11, the similar control operation can be defined for the safety control.

An example of "degeneration" in FIGS. 9 to 11 will be described below.

(1) Degeneration of Facility Control

The degeneration of the facility control means that the operation is performed in a restricted state in terms of the range, the function, the productivity, and the like.

A zone that becomes the control target can be restricted as the range. For example, a control side such as the control device, a module attached to the control device, and a unit attached to the control device can be restricted as the zone that becomes the control target. Alternatively, a controlled side (control target) such as a specific machine, a line, a floor, or an entire factory can be restricted.

Specific processing (for example, information control, standard control, and safety control) among the processing provided by controller system 1 can be restricted as the function.

As the productivity, the productivity (for example, a line speed, the number of products per unit time, and a production amount per unit time) can be temporarily restricted for safety and security.

(2) Degeneration of Information Communication

The degeneration of the information communication means that the operation is performed in the limited state in terms of the range, a direction, a band, quality of service (QoS), data, and the like.

For example, a communication physical port, a communication logical port, and network disconnection can be restricted as the range.

When the communication physical port is restricted, use of a specific port in the communication ports disposed in control unit 100 and security unit 200 can be restricted. Alternatively, only the upper side or the field side of the communication ports mounted on controller system 1 may be enabled.

When the communication logical ports is restricted, an available TCP/UDP port may be restricted, or an available communication protocol may be restricted. Furthermore, a MAC address or an IP address that receives the access may be restricted.

For example, the direction in which data flows in each port may be restricted to only one direction as the direction. For example, for a specific port, only the reception of the data is permitted, or only the transmission of the data is permitted. By permitting only the unidirectional data, the data can be prevented from being leaked from controller system 1 when any security threat is detected.

As the band, the communication speed may be restricted (for example, 1 Gbps is changed to 100 Mbps) in order to reduce the communication load or the processing load of controller system 1.

The priority of a packet to be passed may be dynamically changed as the QoS. For example, when any security threat is detected, the priority of the packet to be passed may be changed to be high.

For example, in an industrial network protocol such as EtherCAT, switching of validity and invalidity of process data communication and update of an output value may be restricted (update stop/zero clear/hold previous value) as the data.

The "degeneration" is not limited to the above, and may include the operation in the state in which arbitrary restriction is added to the normal operation. The "degeneration" can also be regarded as partial stop, and the "stop" can also be regarded as a concept obtained by extending the "degeneration" because the "stop" can include complete stop of a specific function.

FIG. 12 is a flowchart illustrating a processing procedure when the security threat is detected in controller system 1 of the embodiment. Each of processor 102 of control unit 100, processor 202 of security unit 200, and processor 302 of safety unit 300 executes the program, thereby implementing each step in FIG. 12.

Referring to FIG. 12, security unit 200 determines whether the unauthorized intrusion is generated based on the processing performed by control unit 100, a packet flowing on the network, and the like (step S100). When the unauthorized intrusion is not generated (NO in step S100), the processing in step S100 is repeated.

When the unauthorized intrusion is not generated (YES in step S100), security unit 200 notifies control unit 100 of the incident characteristic corresponding to the detected unauthorized intrusion (security threat) (step S102). Upon receiving the notification of the incident characteristic from security unit 200, control unit 100 determines whether a predetermined condition regarding the change of the operation is satisfied (step S104).

When the predetermined condition regarding the change of the operation is satisfied (YES in step S104), control unit 100 changes the operation of the target facility or machine corresponding to the satisfied condition (step S106).

On the other hand, when the predetermined condition regarding the change of the operation is not satisfied (NO in step S104), the processing in step S106 is skipped. Then, the processing from step S100 is repeated.

<H. Visualization of Security Information and User Assistance>

Normally, because a security event is invisible, it is difficult for the worker in the OT department to grasp the current status. For this reason, controller system 1 of the exemplary embodiment visualizes security information and provides user assistance when the unauthorized intrusion is detected.

(h1: Status)

When security unit 200 detects any unauthorized intrusion, the user may be notified using indicator 224 disposed on the surface of security unit 200, indicator 124 disposed on the surface of control unit 100, indicator 824 of HMI 800 (see FIG. 5), and the like. In this case, a change in an arbitrary display mode such as a lighting color change, a lighting start, and a blinking start may be used before and after the detection of the unauthorized intrusion. Furthermore, not only the display but also sound or a voice message may be used.

The security threats can also be quantified in accordance with a security risk. In the specification, the "security risk" is a term quantitatively indicating a probability or a degree of the detection as the unauthorized intrusion. For example, the "security risk" can be calculated by an arrival frequency of packets performing random falsification, the degree of the DDoS attack, and the like. When the quantified security risk is obtained, the calculated degree may be displayed on indicator 124 disposed on the surface of control unit 100 and indicator 824 of HMI 800.

FIG. 13 is a schematic diagram illustrating an example of the indicator adopted in controller system 1 of the embodiment. FIG. 13 illustrates a configuration example when the quantified security risk is displayed. For example, three LEDs are arranged in indicator 224. Lighting colors of the three LEDs are green, yellow, and red, respectively. When a risk level is low, only the green LED lights up. When the risk level is medium, the green LED and the yellow LED light up. When the risk level is high, the green LED, the yellow LED, and the red LED light up.

As described above, security unit 200 includes a presentation means that presents the security risk calculated from the detection operation by the security engine 250 as the detection means to the user. By disposing indicator 224 as described above, even a worker having no expert knowledge can easily grasp the current status of the security risk. The indicator is not limited to the indicator in FIG. 13, but any indicator may be adopted as long as the indicator can present the security risk.

<I. Problems in Restoration of System>

A smaller probability of the generation of the security risk is more preferable. However, on the other hand, the user has less opportunity to perform appropriate processing when the security risk is generated. For this reason, there may be a possibility that the worker cannot accurately grasp the event (the generation of the security risk) indicated by indicator 224. For example, it is also assumed that the user determines that the turn on of the yellow LED is an abnormality of the operation of controller system 1 (for example, runaway of the program). In such a case, the user may erroneously restart (reset) the system.

FIG. 14 is a view illustrating a situation assumed in recovery of control system 10 after the generation of the incident. The security incident is generate during the operation of control system 10. Alternatively, security unit 200 detects the security risk (step S101).

In this case, a factory automation (FA) device or control system 10 performs the degeneration operation or temporarily stops (step S102). An engineer in the IT department executes recovery and countermeasure work to cancel the security incident (step S103).

Meanwhile, an engineer in the OT department restarts control system 10 (production system). However, in the state where the incident is not canceled, control system 10 is erroneously restarted (step S104). In this case, the security damage may be expanded, and for example, leakage of information, failure of the device, and the like may be generated (step S105).

Alternatively, after control system 10 is restarted, the security incident (or security risk) is detected again (step S106). In this case, the FA device or control system 10 is again degenerated or temporarily stopped (step S102). In this manner, the processing of steps S102 to S106 may be repeated many times.

Figure 15:
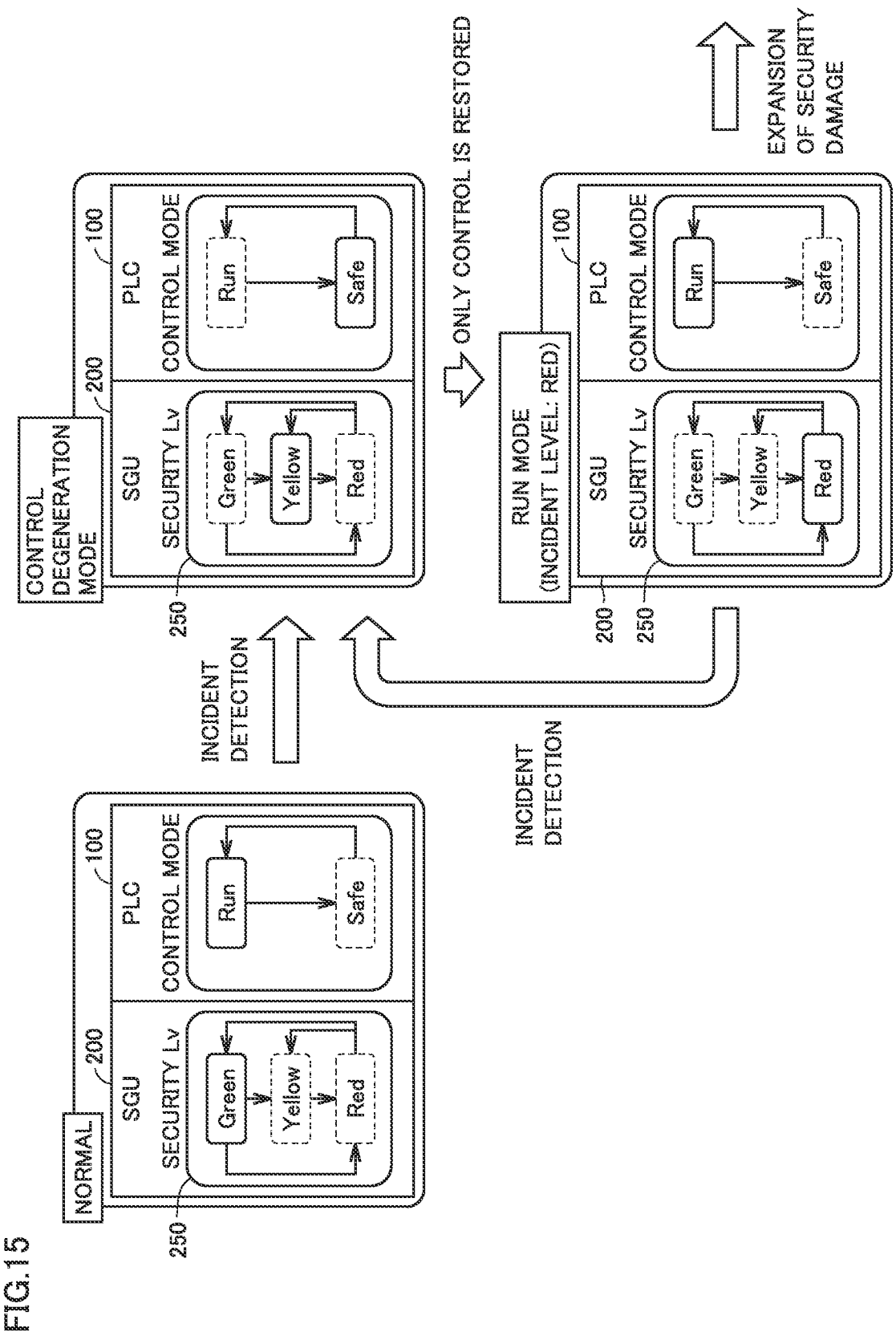
FIG. 15 is a view illustrating a state of a system corresponding to the situation in FIG. 14.

FIG. 15 is a view illustrating a state of a system corresponding to the situation in FIG. 14. Referring to FIG. 15, control unit 100 (denoted as "PLC" in FIG. 15) has a "run" mode and a "safe" mode as control modes. The Run mode is a normal mode. The safe mode is a degeneration mode, and is a mode executing a limited operation of controller system 1.

Security engine 250 of security unit 200 detects three levels of "green", "yellow", "red" as a security level (Lv) corresponding to the security risk. "Green", "yellow", and "red" also correspond to lighting colors of the LEDs of indicator 224. The green level is a level when the security is safe. The yellow level is a level when the incident is detected. The red level is a level when the incident is generated.

During the normal operation of the controller system, the control mode is the run mode, and the security level is the green level. When the incident is detected, the security level changes from "green" to "yellow", and the control mode transitions from the run mode to the safe mode.

In this state, it is assumed that control unit 100 is restored. The control mode returns from the safe mode to the run mode. However, the security level detected by security unit 200 is "red". That is, the incident is not canceled. There is a possibility that the security damage is expanded by causing control unit 100 to execute the normal operation without canceling the incident.

Alternatively, even when the control mode is returned to the run mode by temporarily recovering control unit 100, the control mode transitions to the safe mode because the incident is not canceled. While the incident is not canceled, even when control unit 100 is recovered, the control mode temporarily returns to the run mode due to the detection of the incident, but transitions to the safe mode. By repeating the recovery of control unit 100 even though the incident is not canceled, an infinite loop may be generated in the transition of the control mode.

<J. Check of Incident Cancellation>

In the embodiment, a check logic of incident cancellation is included in the flow of the restarting processing of the control unit. As a result, erroneous restarting of the controller system can be prevented, so that the spread of security damage (secondary damage) can be prevented.

Figure 16:
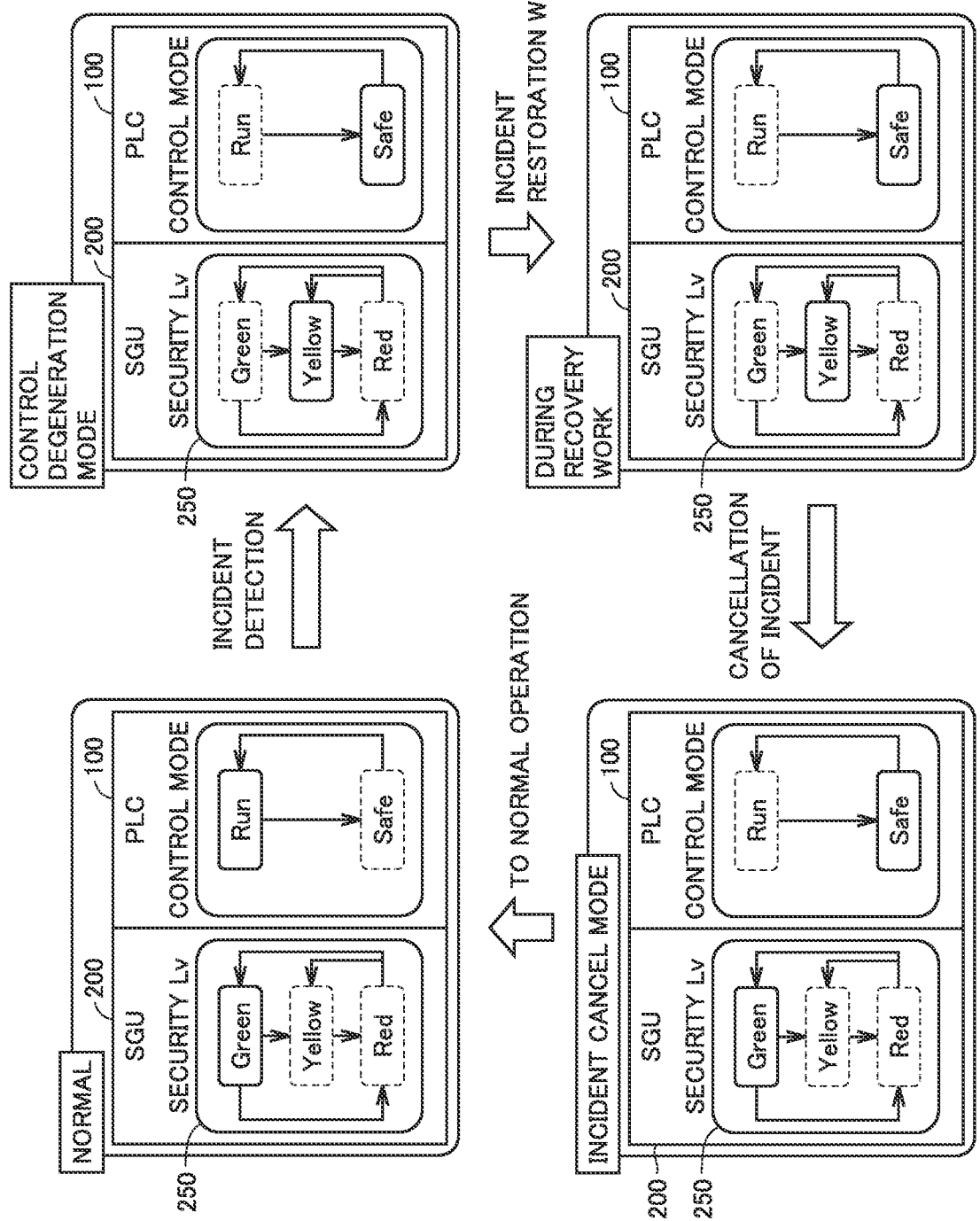
FIG. 16 is a view illustrating a flow of restarting processing of the embodiment.

FIG. 16 is a view illustrating a flow of the restarting processing of the embodiment. When the incident is detected, the control mode of control unit 100 transitions from the run mode to the safe mode. Because this point has already been described, the description will not be repeated. In the embodiment, the control mode cannot transition to the run mode until the incident is canceled. Consequently, the control mode is maintained in the safe mode.

After the incident is canceled, the security level goes to the "green" level. In this state, only control unit 100 is restored. For example, control unit 100 executes the restarting processing. The control mode transitions from the safe mode to the run mode, and the control system operates normally. Even when control unit 100 is restarted (reset) while the security level is a level other than green (yellow or red), the control mode of control unit 100 is the safe mode.

In the embodiment, the security level is checked when the control mode is returned from the safe mode to the run mode. When the security level is green, the control mode can be returned from the safe mode to the run mode. Conversely, when the security level is a level other than green (yellow or red) by detection of the incident, the control mode is kept in the safe mode.

In order to restart controller system 1, it is also conceivable to temporarily turn off entire controller system 1 and then turn on controller system 1 again. However, security unit 200 holds information regarding the status or the security level in a nonvolatile manner. Consequently, when controller system 1 is powered on again, security unit 200 sets the security level based on the information stored in security unit 200. Thus, the status of security unit 200 before the power supply of controller system 1 is turned off is maintained. The information regarding the status or the security level may be information included in security information 260 of FIG. 5.

Control unit 100 sets the control mode based on the status of security unit 200. Consequently, the control mode is set to the mode before the power supply is turned off. Even when controller system 1 is reset by turning on the power again, the control mode of control unit 100 can be maintained in the safe mode until the incident is canceled.

Figure 17:
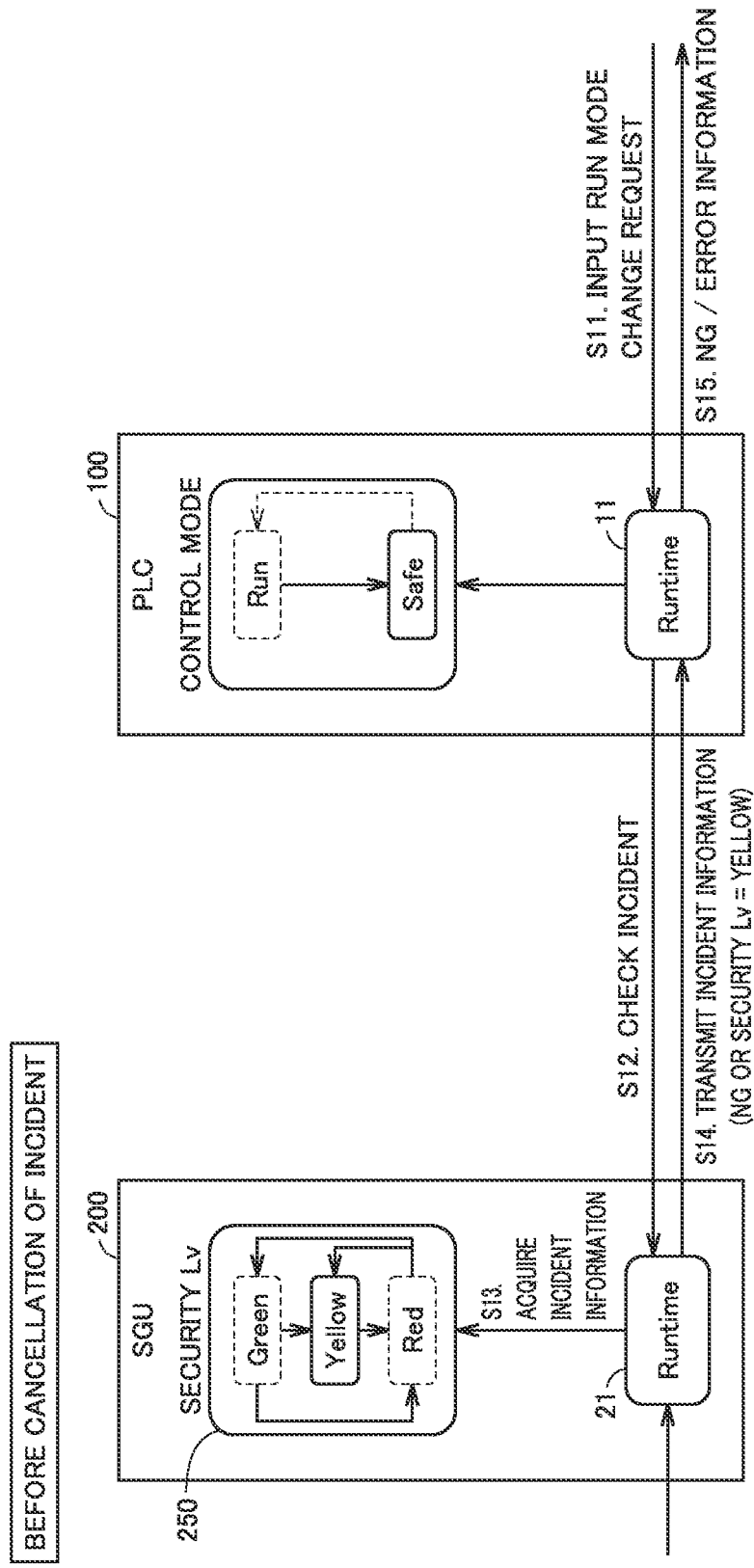
FIG. 17 is a first view illustrating a flow of the restarting processing in the control system of the present embodiment.

FIG. 17 is a first view illustrating a flow of the restarting processing in the control system of the embodiment. FIG. 17 illustrates a processing flow of the control system before the incident cancellation.

As illustrated in FIG. 17, the control mode of control unit 100 is shifted to the safe mode by the detection of the incident. A run mode change request is input to control unit 100 for the purpose of the normal operation (step S11). Control run-time unit 11 checks the incident to security unit 200 (Step S12). A control run-time unit 21 of security unit 200 acquires the incident information from security engine 250 (step S13). The incident information may be information indicating that the change to the run mode is not possible ("NG") or information indicating the security level (the security level is "yellow"). Control run-time unit 21 transmits the acquired incident information to control unit 100 (step S14). The incident information may be information included in security information 260 of FIG. 5.

Control run-time unit 11 of control unit 100 acquires the incident information from control run-time unit 21. Control run-time unit 11 outputs a response to the run mode change request based on the incident information (step S15). This response can include information that a change to the run mode is not possible ("NG") or information of an error.

Figure 18:
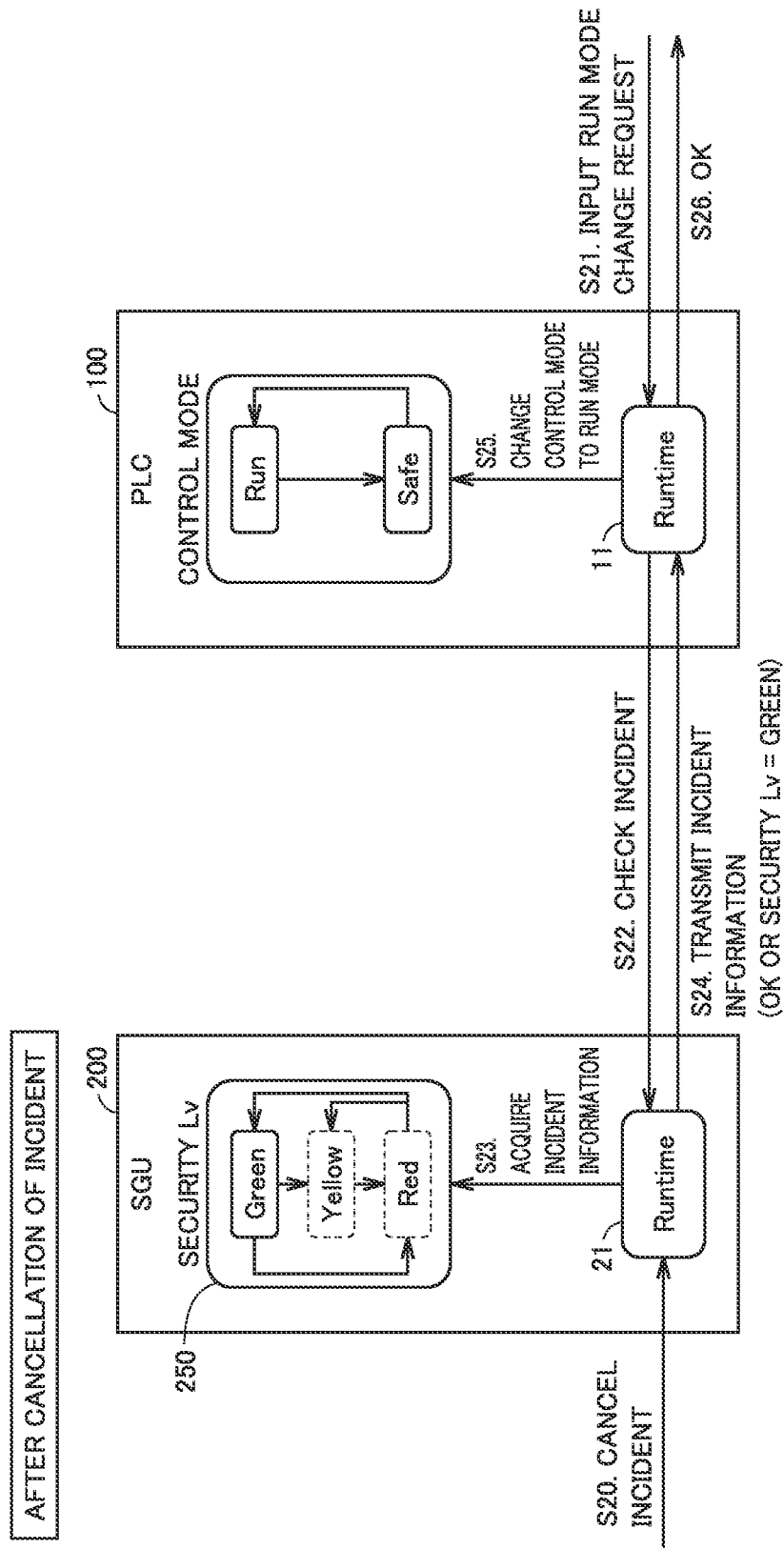
FIG. 18 is a second view illustrating the flow of the restarting processing in the control system of the embodiment.

FIG. 18 is a second view illustrating the flow of the restarting processing in the control system of the embodiment. FIG. 18 illustrates the processing flow of the control system after the incident cancellation.

First, the information indicating that the incident is canceled is input to security unit 200 (step S20). At this point, the control mode of control unit 100 is the safe mode.

The run mode change request is input to control unit 100 (step S21). Control run-time unit 11 checks the incident to security unit 200 (step S22). Control run-time unit 21 of security unit 200 acquires the incident information from security engine 250 (step S23). The incident information may be information indicating that the change to the run mode is possible ("OK") or information indicating the security level (the security level is "green"). Control run-time unit 21 transmits the acquired incident information to control unit 100 (step S24).

Control run-time unit 11 of control unit 100 acquires the incident information from control run-time unit 21. Control run-time unit 11 changes the control mode from the safe mode to the run mode based on the incident information (step S25). Furthermore, control run-time unit 11 outputs the response to the change request (step S26). This response can include information that a change to the run mode is possible ("OK").

In this manner, control unit 100 determines the control mode based on the incident information from security unit 200 at the time of the restart processing of the control unit. When the incident regarding the security is not canceled, the control mode is set to the degeneration mode even after the control unit 100 is restarted. The control mode can be prevented from being set to the normal mode by the restart processing of the control unit even though the incident is not canceled.

In the flow of FIG. 18, control unit 100 changes the control mode to the run mode based on the incident information indicating that the incident is canceled. However, a command from a user (security administrator or the like) having administrator authority may be prioritized over the incident information. For example, when the administrator determines that the control mode can be returned even when the security level is yellow, control unit 100 may return the control mode to the run mode by receiving the input from the administrator. For example, when the security level is changed due to a malfunction (erroneous detection or the like) of security unit 200, the control mode of control unit 100 can be returned from the degeneration mode to the control mode. In addition, when it is clear that the incident is canceled, controller system 1 can be restored at an early stage.

As described above, according to the embodiment, when the control unit is switched from the degeneration mode to the normal mode, it is determined whether the incident is canceled. When the incident is not canceled, the control mode cannot transition from the degeneration mode to the normal mode. Thus, erroneous restart (operating the control unit in the same manner as in the normal time without canceling the incident) of the control system can be prevented, so that the spread of security damage (secondary damage) can be prevented. Consequently, the reliability of the protection against the threat generated with the networking or the intelligence of the control device and the control system can be enhanced.

<N. Appendix>

As described above, the embodiment includes the following disclosure.

1. A controller system (1) including:
    a control unit (100) configured to execute a control operation in order to control a control target; and
    a security unit (200) that is connected to the control unit (100) and is in charge of a security function for the controller system (1),
    in which
    the control unit (100) has a normal mode and a degeneration mode in which a limited operation of the controller system (1) is executed as a control mode regarding the control operation, and the normal mode and the degeneration mode can transition from each other,
    the security unit (200) includes a detection means (250) that detects presence or absence of an incident regarding security in the controller system (1), and
    the control unit (100) transitions the control mode to the degeneration mode when the detection means (250) detects the incident, and the control unit (100) maintains the control mode in the degeneration mode until cancellation of the incident is detected by the detection means (250).
2. The controller system (1) described in 1, in which
    the control unit (100) acquires incident information regarding the detection of the incident from the detection means (250),
    the control unit (100) changes the control mode from the degeneration mode to the normal mode when the incident information indicates the cancellation of the incident, and
    the control unit (100) sets the control mode to the degeneration mode when the incident information indicates continuation of the incident.
3. The controller system (1) described in 2, in which the control unit (100) determines the control mode based on the incident information when executing restart processing of the control unit (100).
4. The controller system (1) described in any one of 1 to 3, in which
    the security unit (200) stores information about the detection of the incident in a nonvolatile manner,
    the security unit (200) returns a status of the security unit (200) based on the information stored in the security unit (200) when the controller system (1) is restarted by turning on the controller system (1) again, and
    the control unit (100) sets the control mode based on the status of the security unit (200).
5. The controller system (1) described in any one of 1 to 4, in which the security unit (200) changes a status of the security unit (200) regarding the detection of the incident by prioritizing an operation from a user having administrator authority over the incident information.
6. The controller system (1) described in any one of 1 to 5, in which in the degeneration mode, the control unit (100) restricts the control operation.
7. The controller system (1) described in any one of 1 to 5, in which in the degeneration mode, the control unit (100) restricts an operation of the control target.

It should be considered that the disclosed embodiment is an example in all respects and not restrictive. The scope of the present invention is defined by not the above description, but the claims, and it is intended that all modifications within the meaning and scope of the claims are included in the present invention.

REFERENCE SIGNS LIST

1: controller system, 2: first network, 4: second network, 10: control system, 11, 21: control run-time unit, 100: control unit, 102, 202, 302: processor, 104, 204, 304: chip set, 106, 206, 306: main storage device, 108, 208, 308: secondary storage device, 110, 210: communication controller, 112, 212: USB controller, 114, 214, 314: memory card interface, 115, 215, 315: memory card, 116, 118, 120, 216, 218: network controller, 122, 322: internal bus controller, 124, 224, 324, 824: indicator, 142, 144, 242: communication port, 150: control engine, 160: information engine, 170: broker, 180, 360: log database, 200: security unit, 250: security engine, 260: security information, 300: safety unit, 350: safety engine, 400: functional unit, 450: power supply unit, 500: field device, 600: support device, 700: SCADA device, 800: HMI, 900: database, S1 to S106: step

The invention claimed is:

1. A controller system comprising:
    control circuitry configured to execute a control operation in order to control a control target; and
    security circuitry that is connected to the control circuitry and is in charge of a security function for the controller system,
    wherein:
    the control circuitry has a normal mode and a degeneration mode in which a limited operation of the controller system is executed as a control mode regarding the control operation, and the normal mode and the degeneration mode can transition from each other,
    the security circuitry includes detection circuitry that detects presence or absence of an incident regarding security in the controller system,
    the control circuitry transitions the control mode to the degeneration mode when the detection circuitry detects the incident, and the control circuitry maintains the control mode in the degeneration mode until cancellation of the incident is detected by the detection circuitry,
    the security circuitry includes a memory which stores information about the detection of the incident in a nonvolatile manner,
    the security circuitry returns a status of the security circuitry based on the information stored in the memory when the controller system is restarted by turning on the controller system again, and
    the control circuitry sets the control mode based on the status of the security circuitry.
2. The controller system according to claim 1, wherein:
    the control circuitry acquires incident information regarding the detection of the incident from the detection circuitry, the control circuitry changes the control mode from the degeneration mode to the normal mode when the incident information indicates the cancellation of the incident, and the control circuitry sets the control mode to the degeneration mode when the incident information indicates continuation of the incident.

3. The controller system according to claim 2, wherein the control circuitry determines the control mode based on the incident information when executing restart processing of the control circuitry.

4. The controller system according to claim 1, wherein the security circuitry changes the status of the security circuitry regarding the detection of the incident by prioritizing an operation from a user having administrator authority over incident information regarding the detection of the incident.

5. The controller system according to claim 1, wherein in the degeneration mode, the control circuitry restricts the control operation.

6. The controller system according to claim 1, wherein in the degeneration mode, the control circuitry restricts an operation of the control target.

7. The controller system according to claim 2, wherein the security circuitry changes the status of the security circuitry regarding the detection of the incident by prioritizing an operation from a user having administrator authority over the incident information.

8. The controller system according to claim 2, wherein in the degeneration mode, the control circuitry restricts the control operation.

9. The controller system according to claim 2, wherein in the degeneration mode, the control circuitry restricts an operation of the control target.

10. The controller system according to claim 3, wherein the security circuitry changes the status of the security circuitry regarding the detection of the incident by prioritizing an operation from a user having administrator authority over the incident information.

11. The controller system according to claim 3, wherein in the degeneration mode, the control circuitry restricts the control operation.

12. The controller system according to claim 3, wherein in the degeneration mode, the control circuitry restricts an operation of the control target.

13. The controller system according to claim 4, wherein in the degeneration mode, the control circuitry restricts the control operation.

14. The controller system according to claim 4, wherein in the degeneration mode, the control circuitry restricts an operation of the control target.

* * * * *